(12) United States Patent
Ramos et al.

(10) Patent No.: US 9,126,168 B2
(45) Date of Patent: Sep. 8, 2015

(54) CATALYST BED PLATFORM WITH CENTER SUPPORT PIPE

(75) Inventors: Antonio O. Ramos, Houston, TX (US); Benjamin S. Umansky, Fairfax, VA (US); William J. Tracy, III, Burk, VA (US); Ramesh X. Gandhi, Ashburn, VA (US); Hans G. Korsten, Fairfax, VA (US); Enrique Feliz, Chantilly, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 862 days.

(21) Appl. No.: 13/325,148

(22) Filed: Dec. 14, 2011

(65) Prior Publication Data

US 2012/0156111 A1 Jun. 21, 2012

Related U.S. Application Data

(60) Provisional application No. 61/423,257, filed on Dec. 15, 2010.

(51) Int. Cl.
*B01J 8/02* (2006.01)
*B01J 8/00* (2006.01)
*B01J 8/04* (2006.01)

(52) U.S. Cl.
CPC *B01J 8/008* (2013.01); *B01J 8/003* (2013.01); *B01J 8/0015* (2013.01); *B01J 8/0035* (2013.01); *B01J 8/02* (2013.01); *B01J 8/025* (2013.01); *B01J 8/0453* (2013.01); *B01J 2208/00884* (2013.01); *B01J 2208/00938* (2013.01); *B01J 2219/00024* (2013.01); *B01J 2219/185* (2013.01); *Y10T 29/49826* (2015.01)

(58) Field of Classification Search
CPC .......... B01J 8/003; B01J 8/0035; B01J 8/025; B01J 8/0453; B01J 2208/00884; B01J 2208/00938
USPC .................................... 422/219, 311
See application file for complete search history.

(56) References Cited

U.S. PATENT DOCUMENTS

| | | | |
|---|---|---|---|
| 2,267,768 A * | 12/1941 | Tobiasson | 422/648 |
| 3,442,627 A * | 5/1969 | Wilkinson | 422/607 |
| 4,195,064 A | 3/1980 | Betteken et al. | |
| 4,847,430 A | 7/1989 | Quang et al. | |
| 5,456,385 A | 10/1995 | Poussin et al. | |
| 6,183,702 B1 | 2/2001 | Nguyen et al. | |
| 7,074,962 B2 | 7/2006 | Machado et al. | |
| 7,080,745 B2 | 7/2006 | Senften | |
| 7,497,998 B2 | 3/2009 | Tabak | |
| 2005/0020851 A1 * | 1/2005 | Olbert et al. | 562/545 |

(Continued)

FOREIGN PATENT DOCUMENTS

| | | |
|---|---|---|
| CN | 101653710 | 2/2010 |
| GB | 705705 | 8/1954 |

(Continued)

*Primary Examiner* — Jennifer A Leung
(74) *Attorney, Agent, or Firm* — Bruce M. Bordelan; Chad A. Guice

(57) ABSTRACT

A structure and method are provided for adding a catalyst bed platform to an existing reactor without welding to the structural portion of the reactor walls. The structure is constructed from components that can be passed through an existing opening in a reactor. The structure allows a catalyst bed in an existing reactor to be divided into catalyst beds with a reduced length to diameter ratio.

16 Claims, 20 Drawing Sheets

(56) References Cited

U.S. PATENT DOCUMENTS

2006/0272985 A1    12/2006    Waddick et al.
2008/0008633 A1    1/2008    Filippi et al.
2008/0021242 A1    1/2008    Tanimoto et al.
2009/0214410 A1    8/2009    Blanchard et al.

FOREIGN PATENT DOCUMENTS

GB    2139914    11/1984
GB    2329597 A    3/1999
WO    02070120 A1    9/2002

\* cited by examiner

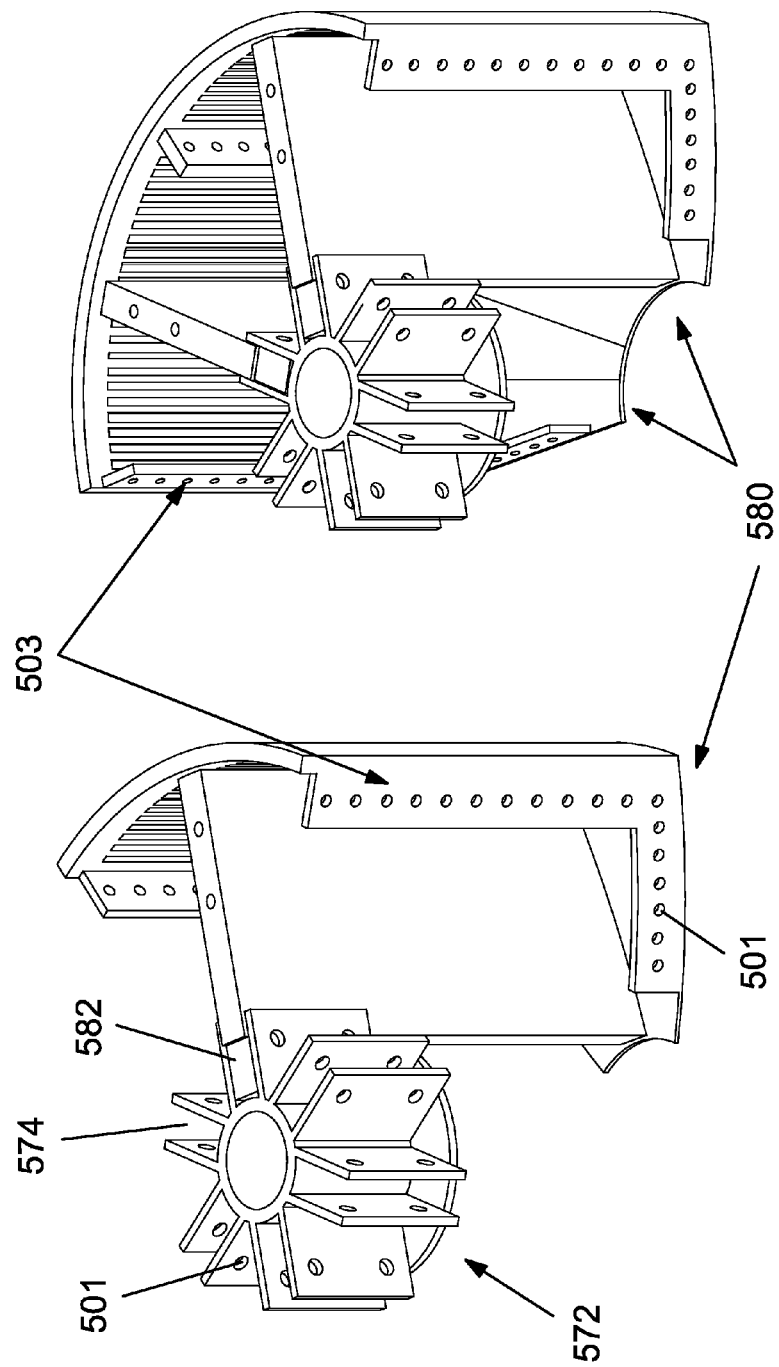

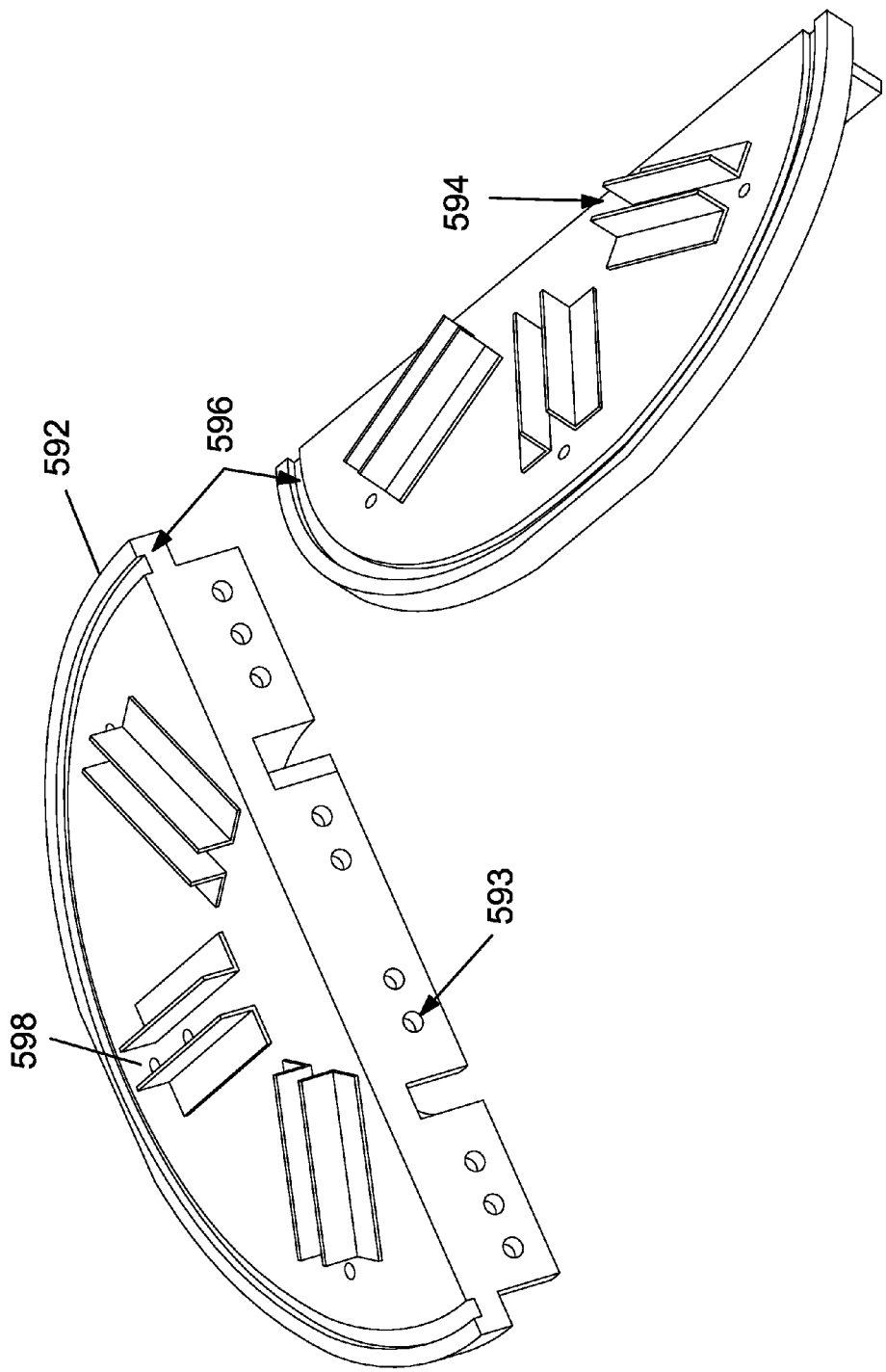

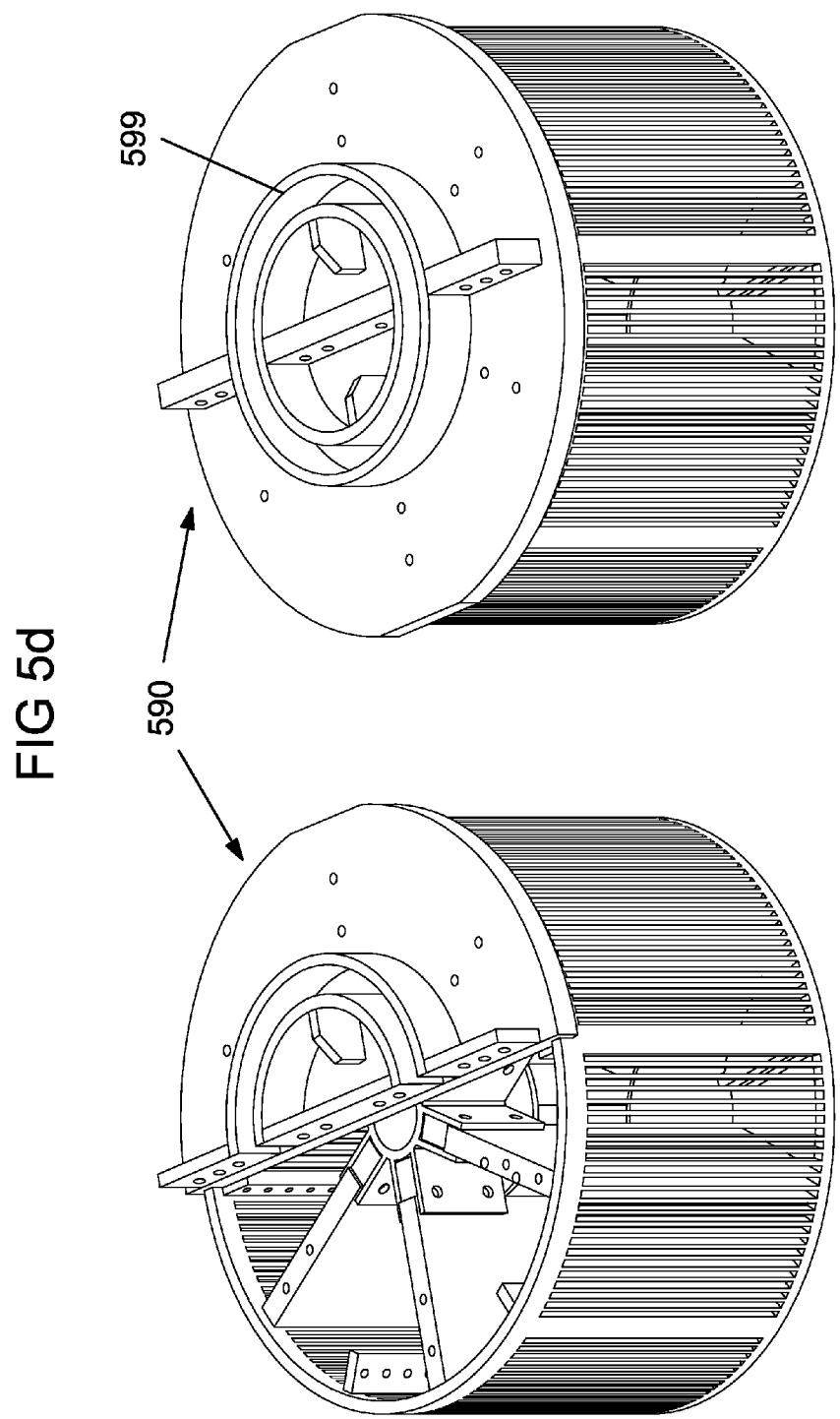

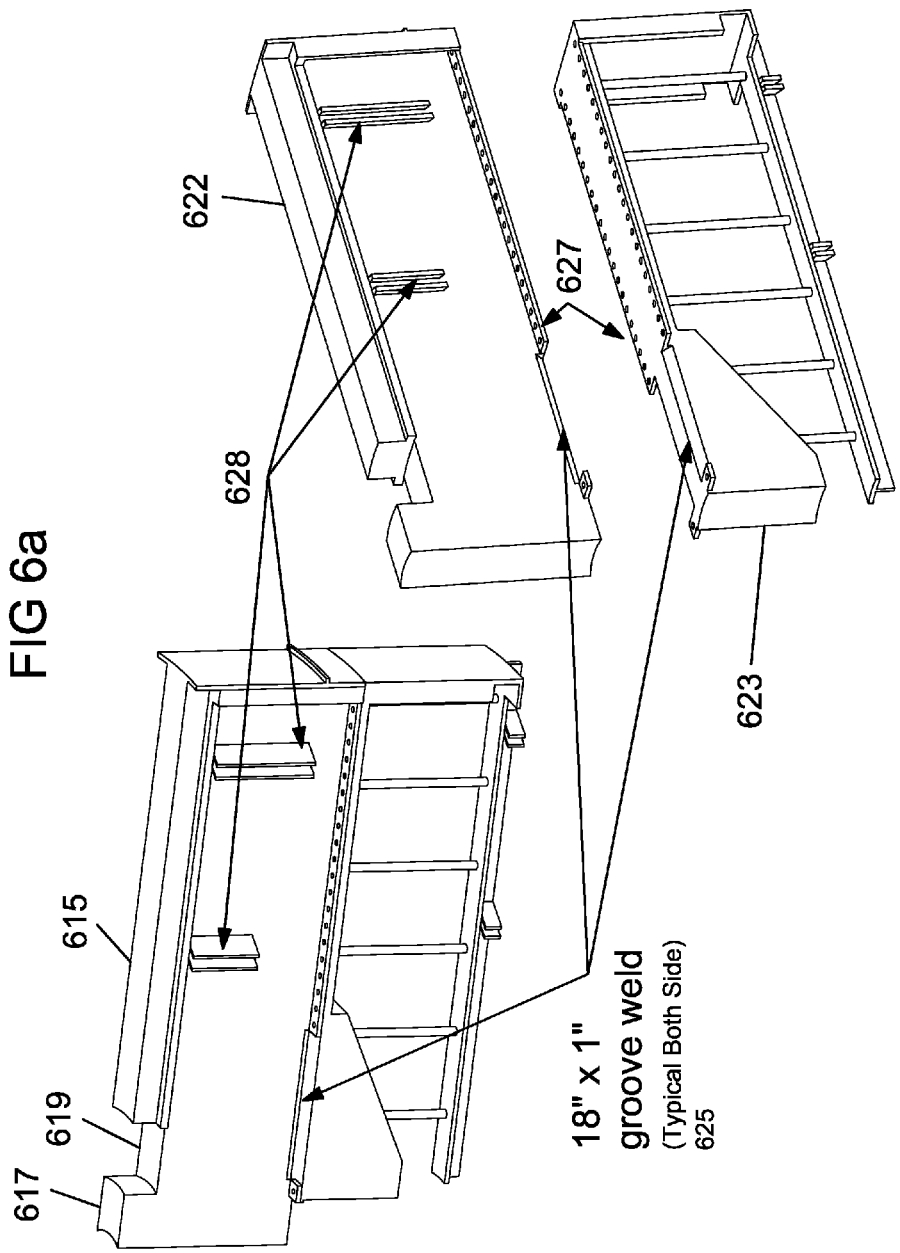

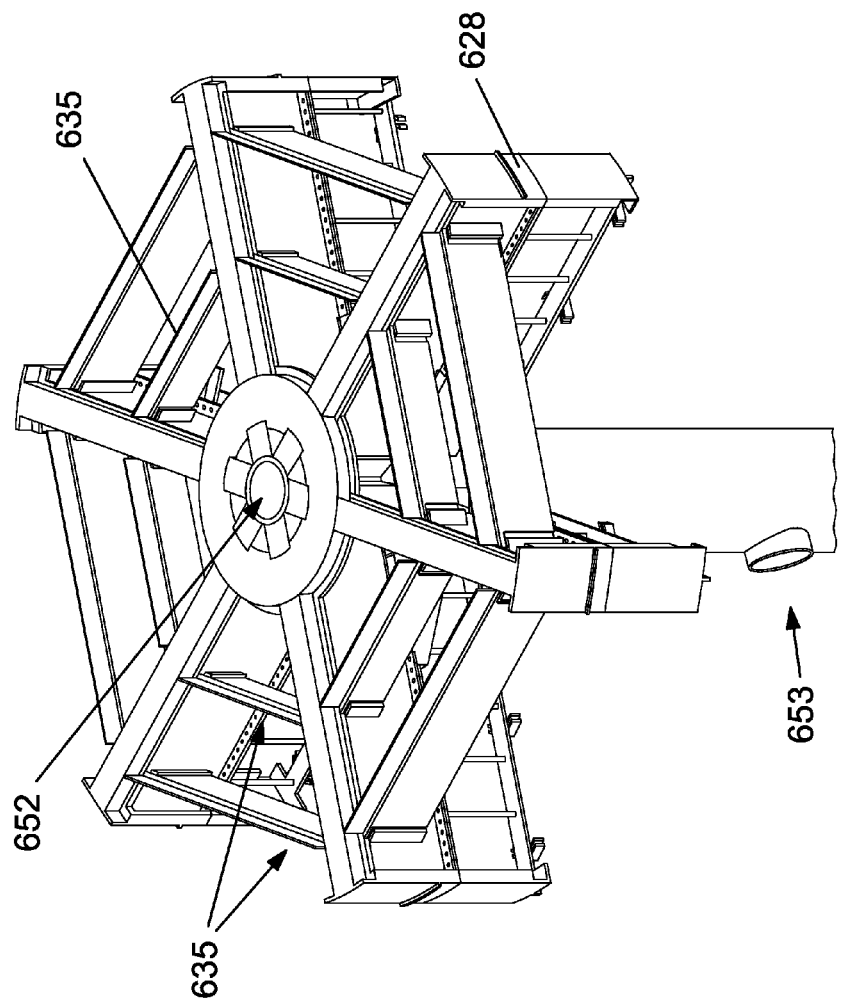

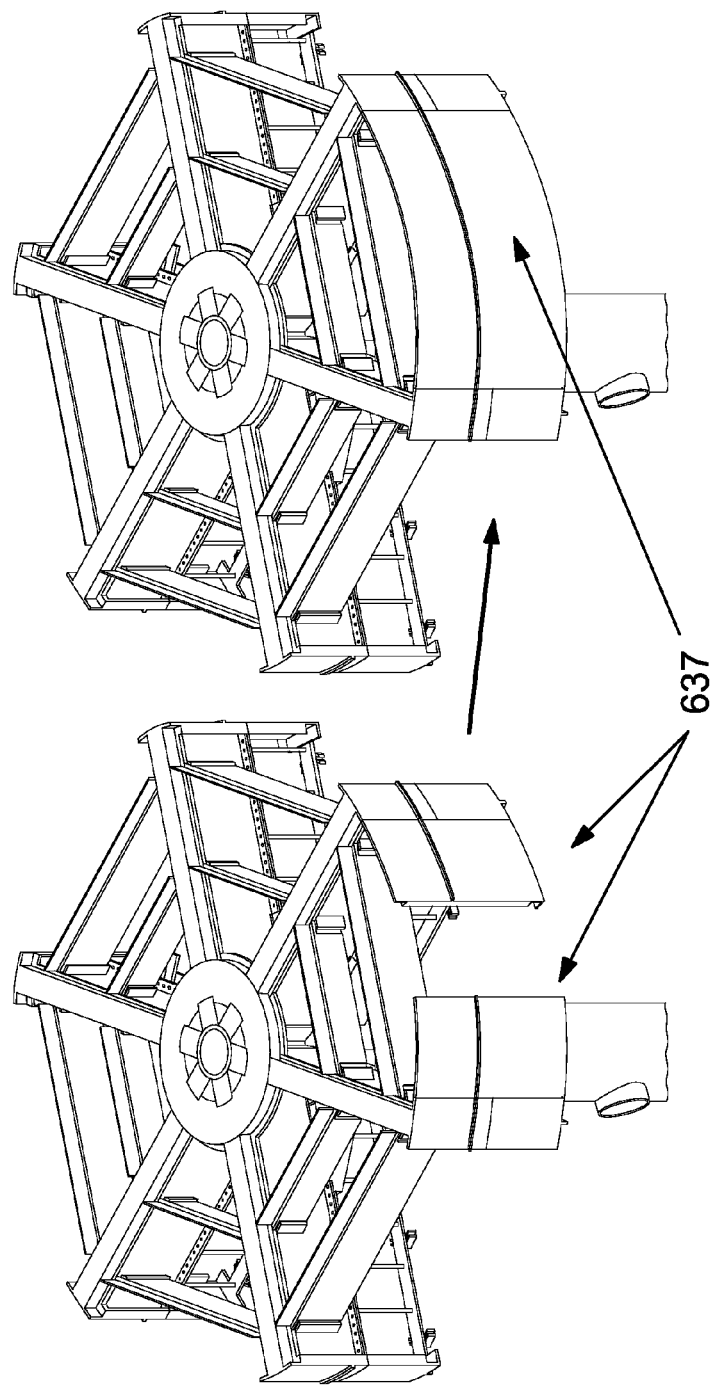

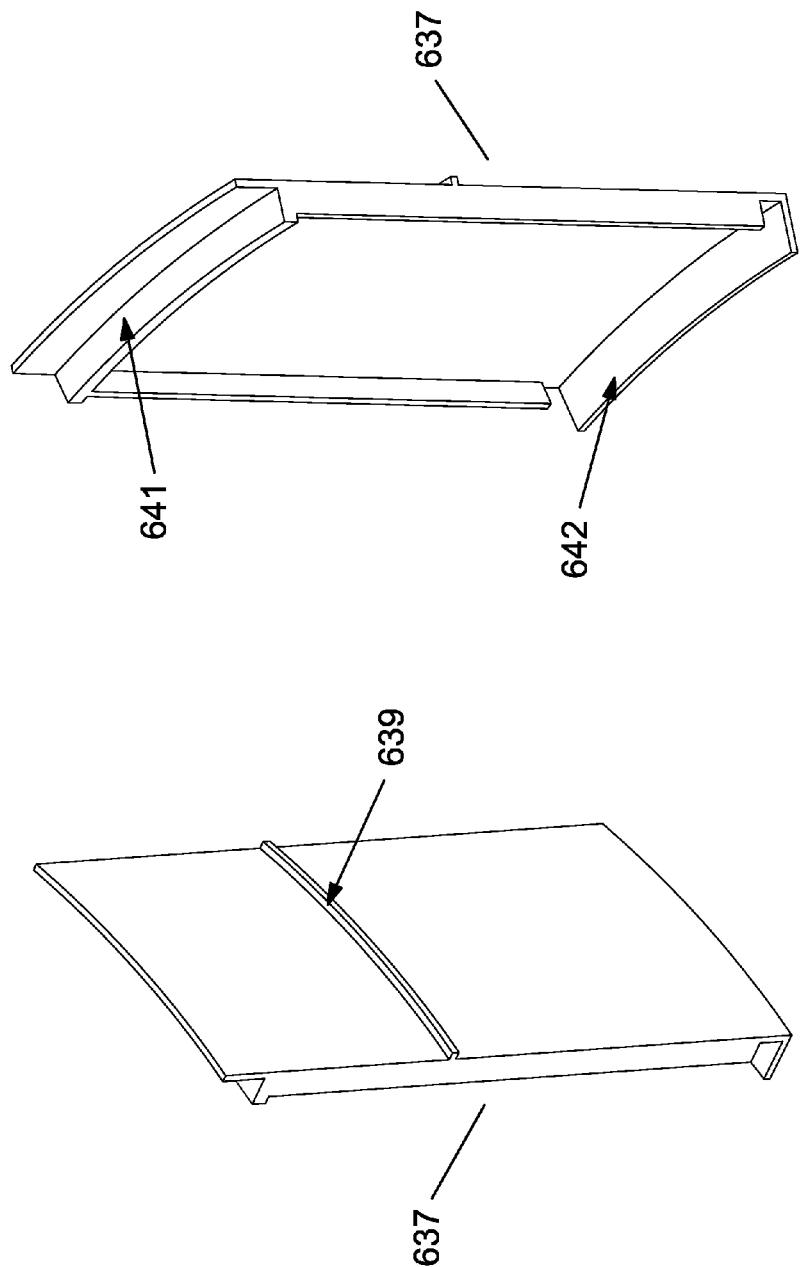

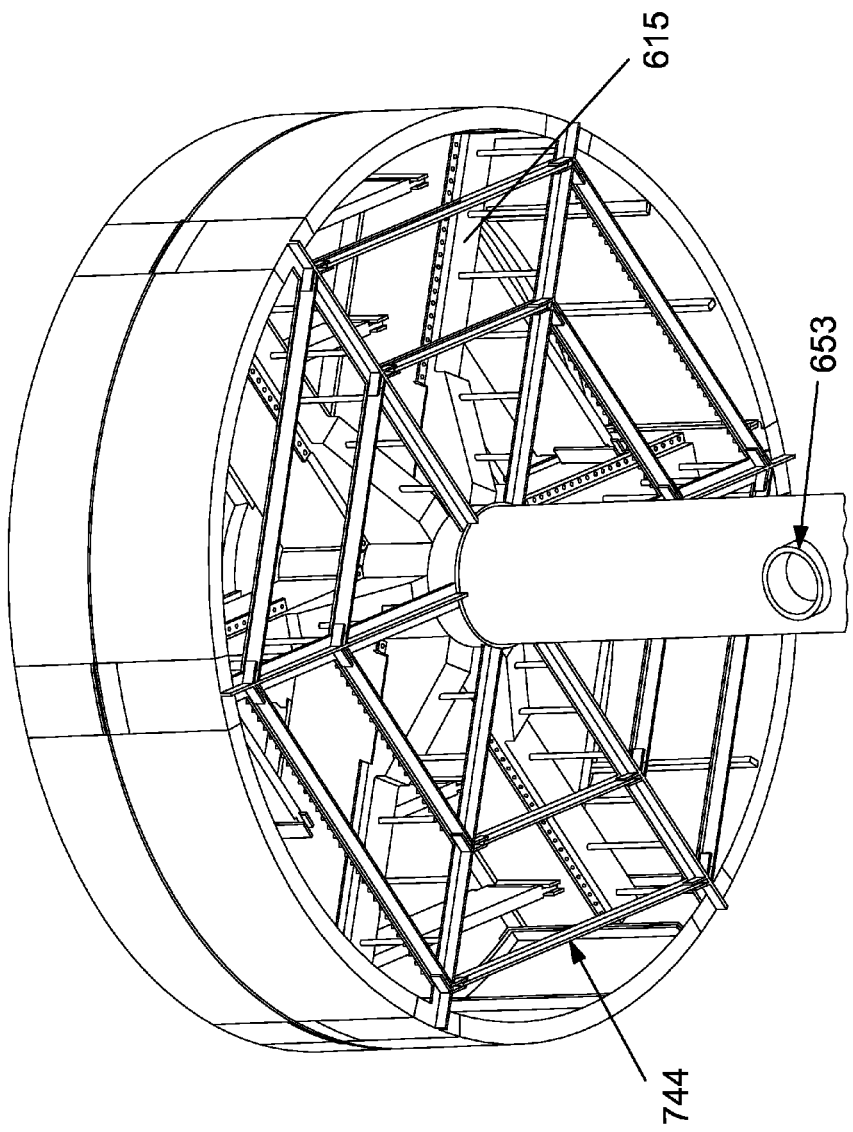

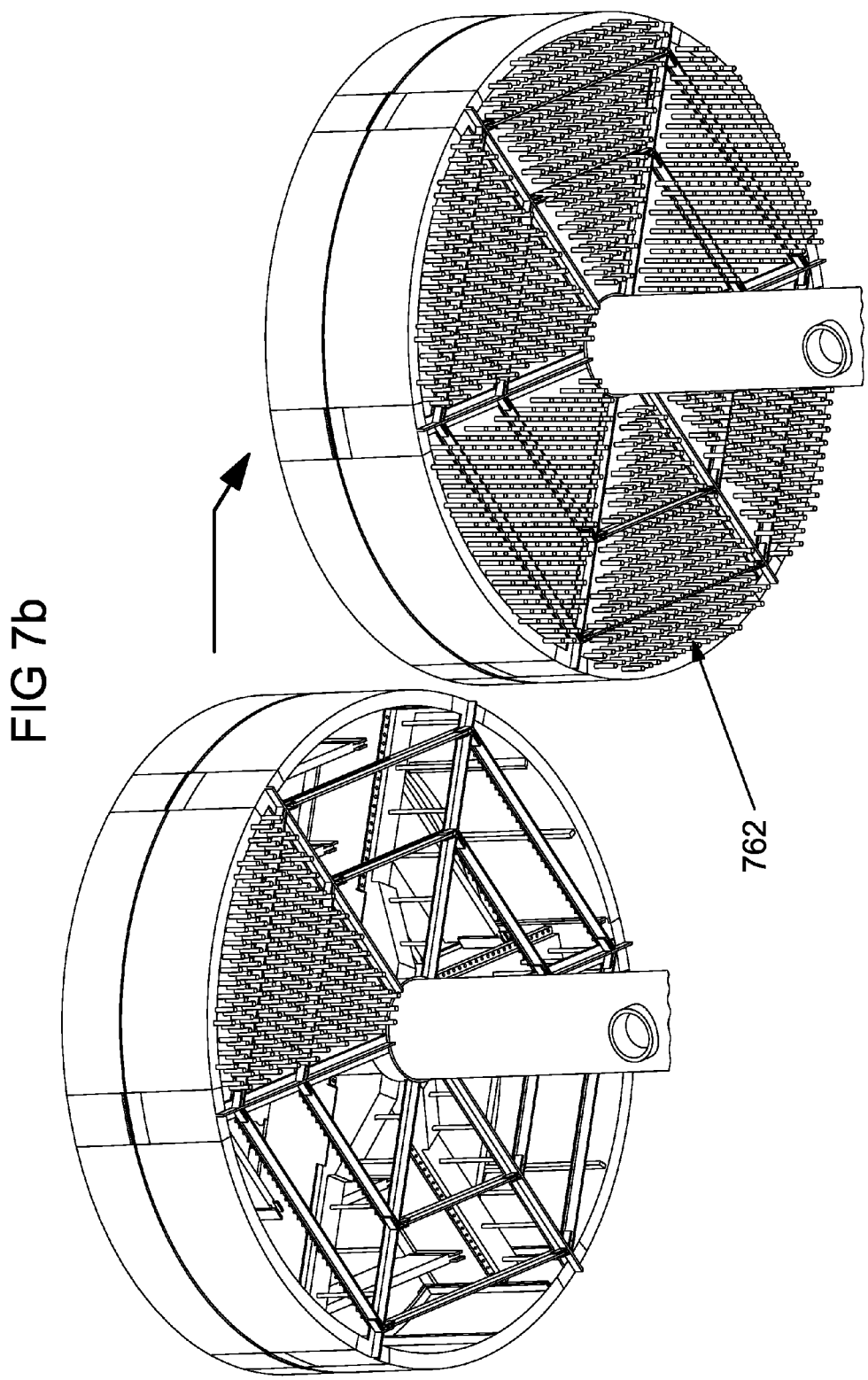

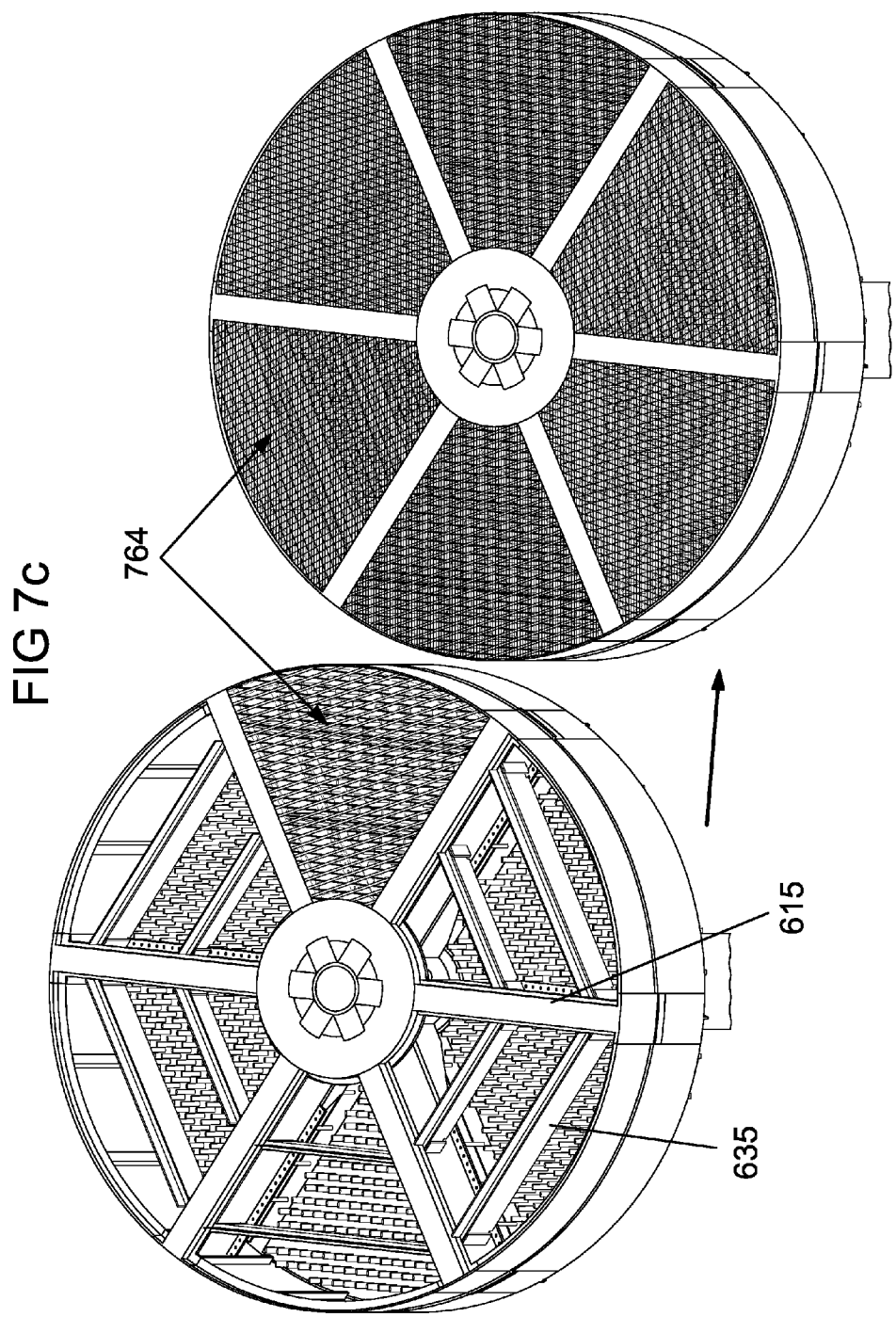

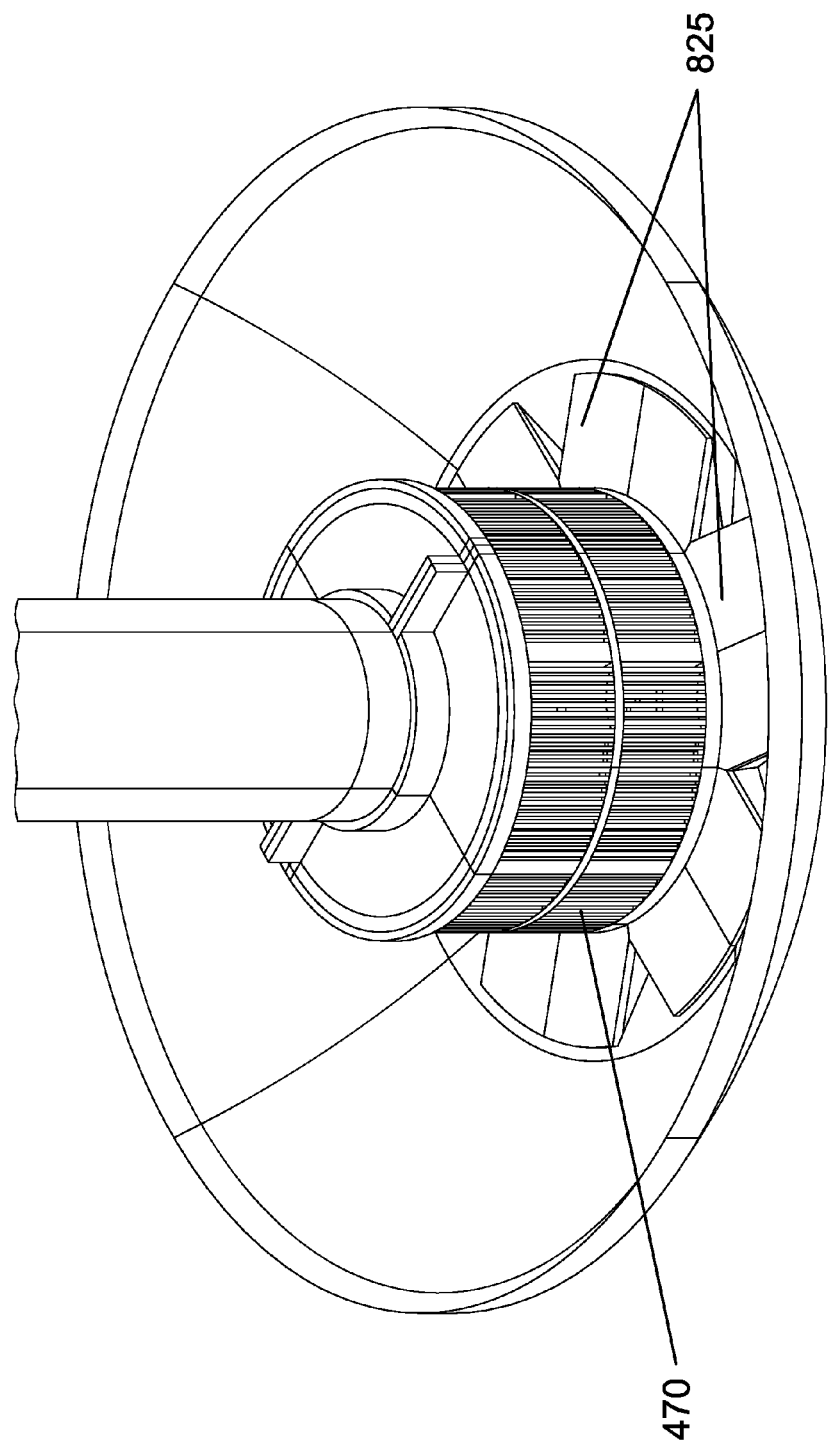

CATALYST BED PLATFORM WITH CENTER SUPPORT PIPE

CROSS REFERENCE TO RELATED APPLICATION

This Non-Provisional Application claims the benefit of U.S. Provisional Application No. 61/423,257 filed Dec. 15, 2010.

FIELD OF THE INVENTION

The invention is related to structures and methods for adding a catalyst bed to an existing reactor.

BACKGROUND OF THE INVENTION

Reactors for petroleum refining can remain viable from a structural standpoint for multiple decades. However, during this lengthy time period, advancements in refining technology may lead to improved designs or methods that do not match the original reactor structure. Systems and/or methods that allow older reactors to be upgraded to take advantage of newer technologies can result in substantial cost savings, in comparison with retiring a reactor and building a new structure.

Many conventional or heritage catalytic reactors for petroleum refining are single bed reactors. Some of these reactors can have long reactor beds relative to the inner diameter of the reactor. For example, a ratio of the length of the reactor bed to the inner diameter of the reactor can be at least 5:1 or greater. Although the long reactor bed can hold a large volume of catalyst, the single bed configuration can lead to reduced catalyst effectiveness.

One reason for reduced catalyst effectiveness can be poor flow distribution. A poor flow distribution can develop within a catalyst bed for a variety of reasons. The length of the catalyst bed can be one factor, with longer beds typically having an increased likelihood of flow distribution problems. Another problem can be having a low liquid mass flux through the bed, where the amount of liquid flowing through the bed per unit area and per unit time is too low to provide good flow characteristics. Other factors that can contribute to a poor flow distribution can be related to flow bridging within the bed, poor loading of catalyst into the catalyst bed, or liquid plugging. An example of a poor flow distribution can be "channeling" of a feed, where the feed preferentially passes through a portion of the catalyst while exposing other portions of the catalyst to little or no fluid flow. In a single bed reactor, if a problem develops with the flow pattern of the fluids passing through the single catalyst bed, the resulting poor flow distribution will likely continue for the entire length of the bed.

SUMMARY OF THE INVENTION

One aspect of the invention relates to a catalyst bed platform structure comprising: a catalyst bed platform; a support pipe supporting the bottom of the catalyst bed platform, a central axis of the pipe being approximately aligned with a geometric center of the catalyst bed platform; a flow distributor separated from the catalyst bed platform by a gap, the support pipe passing through the flow distributor and attached to the flow distributor to provide support for the flow distributor; and a pipe support structure supporting the bottom of the support pipe, the pipe support structure being adapted to reside on a bottom surface of an existing reactor having walls and a top opening, wherein the catalyst bed platform is formed from components capable of passing into the existing reactor through the top opening, which has a diameter of about 28 inches or less, for example about 26 inches or less or about 24 inches or less, without welding the catalyst bed platform to a structural portion of the reactor walls.

Another aspect of the invention relates to a catalyst bed platform structure comprising: a collector structure; a support pipe supported by the collector structure; a plurality of catalyst support beams extending radially from the support pipe, the plurality of catalyst support beams including a ring groove; a ring support seated in the ring groove, at least a top portion of the support pipe passing through an inner opening of the ring, the ring support connecting the catalyst support beams to the support pipe in a cantilevered manner; a catalyst support grid supported by the catalyst support beams; optionally one or more dumping tubes; and a platform skirt forming an outer diameter surface for the catalyst platform.

Still another aspect of the invention relates to a method for dividing a catalyst bed in a reactor without welding a catalyst bed platform to a structural portion of the reactor walls, comprising: passing a plurality of catalyst bed platform components into a reactor through an opening having a diameter of about 28 inches or less, for example about 26 inches or less or about 24 inches or less, the reactor having a first catalyst bed volume; constructing a catalyst bed platform within the reactor using the catalyst bed platform components; supporting the constructed catalyst bed platform with a support pipe, the length of the support pipe corresponding to a height for the catalyst bed platform within the reactor, wherein the catalyst bed platform divides the first catalyst bed volume into an upper catalyst bed volume and a lower catalyst bed volume, at least one of the upper catalyst bed volume and the lower catalyst bed volume having a length to diameter ratio of about 4:1 or less.

BRIEF DESCRIPTION OF THE DRAWINGS

FIGS. 5a-5d show various views of pieces for a collector for a catalyst bed platform with a center pipe support according to an embodiment of the invention.

FIGS. 6a-6f show various views of pieces for a catalyst bed platform according to an embodiment of the invention.

FIGS. 7a and 7b show various views of pieces for a distributor tray according to an embodiment of the invention.

FIG. 7c shows a catalyst support grid piece according to an embodiment of the invention.

FIG. 8 shows an arrangement of the outlet collector with incorporated support pads.

DETAILED DESCRIPTION OF THE PREFERRED EMBODIMENTS

Overview

Figure 1A:
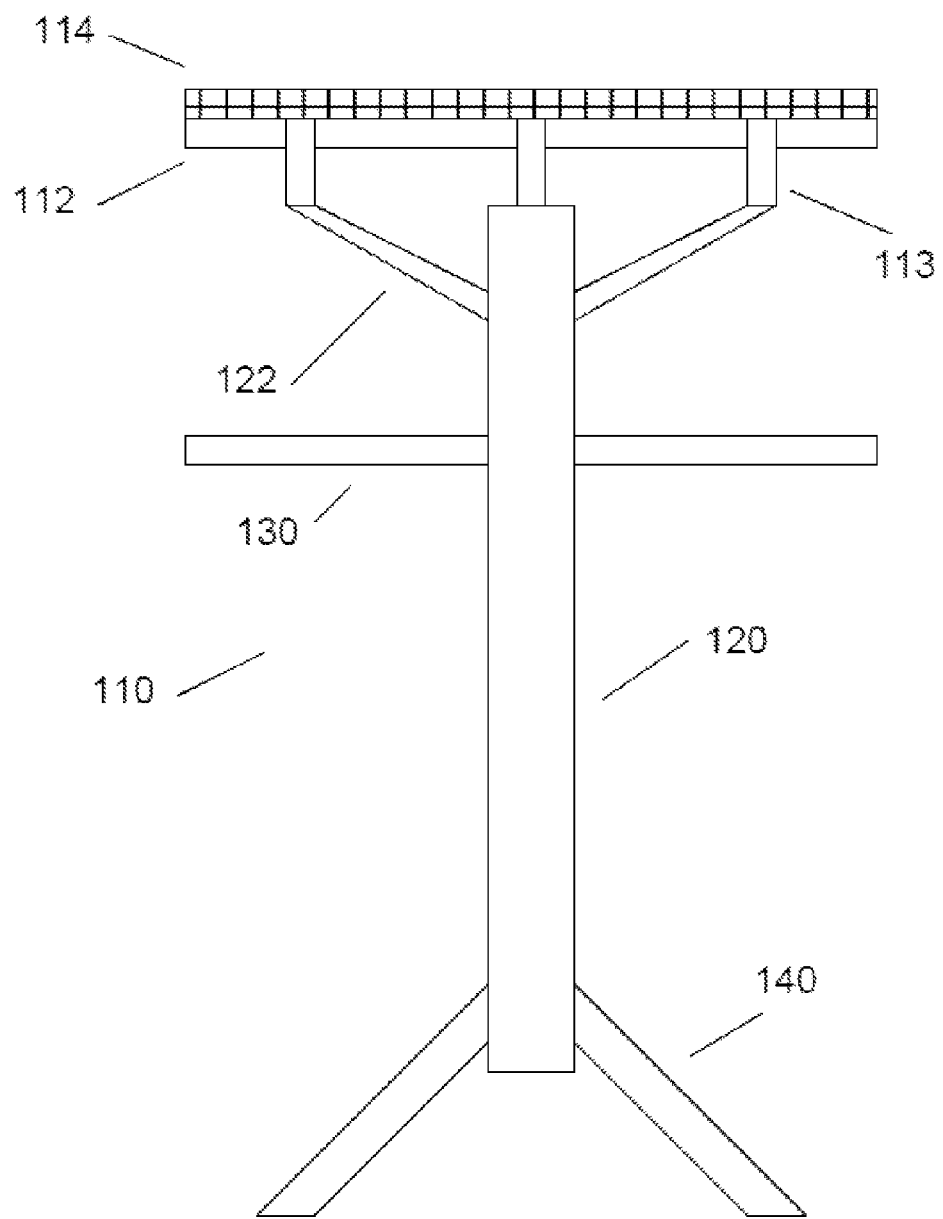
FIG. 1a schematically depicts a catalyst bed platform with a center support pipe according to an embodiment of the invention.

In various embodiments, a catalyst bed platform is provided that can be added to an existing reactor. For example, addition of a catalyst bed platform can convert a reactor with a single catalyst bed to a reactor with multiple catalyst beds. Adding a catalyst bed platform to a reactor can allow for addition of a flow distributor (such as a distributor tray) and/or quench system to a reactor. The flow distributor and/or quench system can be added in the space created below the additional catalyst bed platform. Addition of a distributor tray can allow for improved fluid flow within a reactor, which can result in a corresponding increase in the apparent activity of catalyst.

Multiple bed reactors can be used for a variety of refinery processes, such as hydrodesulfurization processes and cold flow improvement processes. In a multiple bed reactor, a distributor tray and/or other desired reactor internal(s) for distributing fluid flow can be used between beds to redistribute the fluid flow. However, proper operation of a distributor tray typically requires space between the tray and the catalyst bed upstream from the tray. This cannot be achieved in a single catalyst bed system.

Adding a catalyst bed to a reactor poses a variety of challenges. One option for adding a catalyst bed to a reactor can be to weld a catalyst bed platform to the structural portion of the reactor wall(s). In this option, the welds to the structural portion of the reactor wall(s) support the weight of the catalyst bed. Adding a catalyst bed to a reactor in this manner can require a substantial length of time where the reactor is not operational. It is noteworthy that the impact of heating the structural materials of the reactor wall to a sufficient temperature for welding may be unclear.

An additional issue with adding a catalyst bed to a reactor can be the method of access to the inside of the reactor. A typical commercial reactor will generally allow access to the reactor through a top manway, which can have an inner diameter, e.g., from about 18 inches (about 46 cm) to about 36 inches (about 91 cm). Some typical manways in older reactors can have inner diameters from about 20 inches (about 51 cm) to about 24 inches (about 61 cm). Other common examples of manway diameters can be at least about 20 inches (about 51 cm), for example at least about 22 inches (about 56 cm, at least about 24 inches (about 61 cm), at least about 26 inches (about 66 cm), or at least about 28 inches (about 71 cm). Unless a hole is cut in the reactor wall(s), the materials for adding the catalyst bed to an already constructed reactor have to enter through an existing opening. The manway is typically the largest existing opening available in an existing reactor for introducing components to add a catalyst bed. Thus, depending on the embodiment, the pieces for constructing a catalyst bed platform structure can be pieces that can pass through an opening having a diameter of about 36 inches (about 91 cm) or less, for example about 28 inches (about 71 cm) or less, about 26 inches (about 66 cm) or less, about 24 inches (about 61 cm) or less, about 22 inches (about 56 cm) or less, or about 20 inches (about 51 cm) or less. In some embodiments, the size of the manway can be related to a characteristic dimension of the reactor, such as the reactor inner diameter. Typical reactors can have inner diameters that range from about 8 feet (about 2.4 meters) to about 22 feet (about 6.7 meters). Depending on the embodiment, a ratio of the inner diameter of the reactor to the diameter of the manway can tend to be at least about 4:1, for example at least about 5:1, at least about 6:1, or at least about 7:1. Additionally or alternatively, the ratio of the inner diameter of the reactor to the manway diameter can tend to be about 9:1 or less, for example about 8:1 or less, about 7:1 or less, or about 6:1 or less.

Another consideration for adding a catalyst bed platform to a reactor is the structural integrity of the additional bed platform. A catalyst bed can have a substantial weight when loaded into a reactor. In addition to this static weight, a catalyst bed platform can experience a load due to the pressure drop of fluid passing through the catalyst bed during operation. A concern for a catalyst bed platform supported by a central support pipe can be that the support structure may undergo plastic deformation if the load is not properly transferred to the floor of the reactor vessel.

In various embodiments, structures and methods are provided for upgrading an existing (already constructed) reactor to include an additional catalyst bed. In an embodiment, a catalyst bed platform with a center support pipe can be used to add a catalyst bed to a reactor. The structure can include a catalyst bed platform for holding catalyst. The catalyst bed platform can include a grid with a mesh size small enough to allow fluid to pass through while retaining catalyst particles of typical size. Optionally, a flow distributor such as a distributor plate and/or other desired reactor internal(s) can be located below the catalyst bed platform to allow for more even distribution of a fluid flow. The structure can also include a center support pipe for supporting the catalyst bed platform and the optional distributor plate. The support pipe can support the catalyst bed platform via a plurality of radial support arms. The radial support arms can be connected to the support pipe in a cantilevered manner using a ring support. The center support pipe can have a hollow interior to allow for removal of catalyst from the catalyst bed. The center support pipe can pass through the flow distributor and can optionally be attached to the flow distributor to provide support. The flow distributor can be supported directly by attachment to the support pipe, or the flow distributor can be supported by radial support beams that are themselves supported by the support pipe. The top of the pipe can be in direct contact with the bottom of the catalyst bed platform. One or more catalyst dumping tubes can allow for removal of catalyst from the catalyst bed platform. A catalyst dumping tube can allow catalyst to be removed from the catalyst bed platform via the hollow interior of the center support pipe. Additionally or alternately, one or more catalyst dumping tubes can be included at other locations to allow for removal of catalyst from the catalyst bed platform.

In various embodiments, a catalyst bed platform with a center support pipe can be added to an existing reactor using the manway as the entry point for the materials used to construct the platform. The catalyst bed platform with a center pipe support can have a modular construction, so that the platform can be assembled from a series of components that can be passed through the manway.

The catalyst bed structure can be placed in a reactor without welding the structure to the structural portion of the reactor wall(s). Instead, the center support pipe can provide the support for the weight of the catalyst bed platform. The catalyst bed platform can have an outer diameter that roughly corresponds to the inner diameter of the reactor. To form a contact with the inner wall of the reactor, a packing material can be used to fill a gap between the platform and the inner wall. In an alternative embodiment, the catalyst bed platform can be clipped or welded to a protective layer, cladding, or coating of a reactor wall, but such clipping or welding should substantially not result in a structural connection between the structural portion of the reactor wall(s) and the catalyst bed platform.

A catalyst bed platform supported by a center support pipe can provide a variety of advantages relative to a conventional catalyst bed platform welded to a reactor wall. In some embodiments, installing a catalyst bed platform with a center support pipe can reduce the non-operational time required for adding the catalyst bed. A catalyst bed platform with a center support pipe can be constructed using a scaffold within the reactor. Because welding to the structural portion of the reactor wall is not required, the amount of time for installation can be reduced.

In some embodiments, the addition of a catalyst bed platform can improve the flow characteristics within a reactor. For example, one method for characterizing a reactor can be the length of catalyst beds within the reactor versus the diameter of the reactor. In an embodiment, a reactor with a single catalyst bed can initially have a ratio of catalyst bed length to reactor diameter of at least about 3:1, for example at least about 4:1, at least about 5:1, at least about 6:1, at least about 7:1, or at least about 8:1. Additionally or alternately, a catalyst bed platform can be added to the reactor to allow formation of two catalyst beds. In such an embodiment, at least one of the resulting catalyst beds can have a ratio of catalyst bed length to reactor diameter of about 4:1 or less, for example about 3:1 or less, about 2.5:1 or less, about 2:1 or less, or about 1.5:1 or less. Further additionally or alternately, both resulting catalyst beds can have a ratio of catalyst bed length to reactor diameter of about 3:1 or less, for example about 2.5:1 or less or about 2:1 or less. Still further additionally or alternately, addition of a catalyst bed platform to a reactor can reduce the total amount of catalyst loaded into the reactor. However, due to improved flow characteristics, the reduced amount of catalyst can be used more efficiently, leading to a higher apparent activity for the catalyst, Catalyst Bed Platform In various embodiments, any convenient type of catalyst bed platform can be used for supporting a catalyst. The catalyst bed platform can be selected based on the type of catalyst to be used in the catalyst bed. One consideration can be related to the size of the mesh or grid used for the catalyst bed platform. The mesh size can be selected to be small enough that catalyst particles are retained within the catalyst bed. This can be achieved, for example, by having a catalyst bed platform with a suitable mesh size. Additionally or alternately, the catalyst bed platform can be constructed of a plurality of intersecting beams, with an overlay grating that provides a suitable mesh size.

In an embodiment, the primary support for the weight of the catalyst bed platform can be provided by a support pipe. This is in contrast to supporting the weight of the catalyst bed by welding or otherwise attaching the catalyst bed platform to the wall(s) of the reactor. Typically, a reactor wall can include two types of materials. The structural portion of a reactor wall can be composed of a bulk structural material. The bulk structural material can be selected for a variety of reasons, including structural properties, heat transfer properties, and/or the weight or cost of the material. An example of a suitable material can be steel, such as a steel that complies with ASTM A387. A typical thickness for the reactor wall can be used, such as about 90 mm or greater, for example about 100 mm or greater, about 105 mm or greater, or about 110 mm or greater. More generally, the thickness of a reactor wall can be from about 50 mm to about 300 mm or more. Note that reactor walls are often thinner near the bottom and top of a reactor. This can be due to the hemispherical shape typically found at the top and bottom of cylindrical reactors, which shape is structurally more stable. The range of reactor wall thicknesses reflects this variation. Thus, a reactor wall thickness of about 50 mm can be more likely to occur at the top or bottom of a reactor, while a wall thickness of about 300 mm can be more likely to occur in the cylindrical main body of a reactor.

The portion of a reactor wall that faces the reaction environment can be referred to as the interior portion of the reactor wall. The interior portion of the reactor wall can be covered with a material that is resistant to corrosion or other reactions based on the activity occurring within the reactor. This covering material can be a protective/cladding layer that is typically thinner than the bulk structural material. A stainless steel such as TP 347 can be a suitable cladding material. A suitable cladding layer can have a thickness of at least about 2 mm, for example at least about 3 mm or at least about 5 mm. Additionally or alternately, the cladding layer can be about 10 mm or less, for example about 8 mm or less or about 5 mm or less. In some embodiments, a cladding layer thickness of about 3-4 mm can be typical.

In a conventional design, a catalyst bed platform can be supported by attaching the platform to the structural portion of the reactor walks). For an existing reactor, a typical attachment can require welding the catalyst bed platform to the bulk structural material that lies underneath the protective cladding layer.

In various embodiments, however, attachment of the catalyst bed platform to the bulk structural material of the reactor wall(s) can be avoided by using a support pipe to support the weight of the platform. In some embodiments, the outer diameter of the catalyst bed platform can have a surface that complements the inner surface of the reactor wall(s), resulting in contact between the outer surface of the platform and the inner wall(s). Such complementary contact can advantageously provide little or no gap between the outer surface of the platform and the inner wall(s), such that the feedstock can substantially pass through the catalyst bed and advantageously not (or as little as possible) around the edge of the platform. In an alternative embodiment, contact with the inner wall(s) of the reactor can be made in the form of clipping (or otherwise attaching) the catalyst bed platform to the protective layer of the reactor wall(s), preferably without attaching the catalyst bed platform to the structural portion of the reactor wall(s), e.g., by welding.

In another embodiment, the catalyst bed platform can have an outer diameter that is smaller than the inner diameter of the reactor. In this type of embodiment, the catalyst bed platform outer surface can optionally include a lip that protrudes out toward the inner wall(s) of the reactor. The lip can be located at an intermediate location on the outer surface of the catalyst bed platform, such as halfway between the top of the platform and the bottom of the platform, or at another location closer to either the top of the outer surface or closer to the bottom of the outer surface. Any gap remaining between the outer surface of the catalyst platform and the inner surface of the reactor wall can then be filled with a material that substantially fills the space between the outer surface of the catalyst platform and the inner surface of the reactor wall(s). The fill material can be, for example, a glass rope material that substantially fills the space in the gap. The fill material can reduce or eliminate the amount of feed that passes around the catalyst bed platform, as opposed to passing through the catalyst bed. Optionally, a particle based fill could be used, so long as the particles are sized to substantially prevent leakage of feed around the catalyst bed platform.

Flow Distributor

In a catalyst bed, a fluid flowing through the catalyst bed may have an uneven distribution for a variety of reasons. The length of the catalyst bed can be one factor, with longer beds typically having an increased likelihood of flow distribution problems. An additional or alternate problem can be having a low liquid mass flux through the bed, where the amount of liquid flowing through the bed per unit area and per unit time can be too low to provide uniform flow characteristics. Other additional or alternate factors that can contribute to a poor flow distribution can be related to flow bridging within the bed, poor loading of catalyst into the catalyst bed, and/or liquid plugging. A further additional or alternate factor can be that the fluid flowing through the catalyst bed may have entered the bed with an uneven distribution. A still further additional or alternate factor can be related to changes in the catalyst in a catalyst bed as fluid is processed in a reactor. For example, some hydroprocessing reactions can result in formation of "coke" on catalyst particles. The formation of "coke" or other changes in the shape of catalyst particles during reaction may alter the space available for fluid flow and/or can lead to random channeling in a catalyst bed. Yet a further additional or alternate possibility is that local formation of "hot spots" in a catalyst bed may alter the flow of fluid through the bed.

When a fluid flow emerges from a catalyst bed, it can be desirable to redistribute the flow, so that the flow can be more evenly distributed when exposed to the next catalyst bed or other reaction stage. This can have a variety of advantages, such as extending the lifetime of catalyst particles and/or reducing potential hazards, such as localized heating in a catalyst bed. A variety of flow distribution devices are available for use. The devices typically include a plate or tray of some type with a plurality of openings to allow fluid to pass through. If too much flow is incident on a portion of the tray or plate, not all of the fluid may be able to pass through the openings near the flow. In such situations, the liquid level in the tray or plate can instead equilibrate, resulting in distribution of the flow over a larger portion of the area of the tray or plate. One or more such trays or plates can be used in a flow distribution device.

During operation, a flow distributor can typically have at least a small height of accumulated liquid in or on the device. If a distribution device is located immediately adjacent to a catalyst bed, this could result in fluid remaining in contact with catalyst for a longer period of time than desired, and/or stagnation of a portion of the fluid in a catalyst bed. To avoid this situation, it can be desirable to have a gap between a catalyst bed and a flow distributor. In a reactor with only a single catalyst bed, such a gap does not exist. As a result, if the fluid flow through a single catalyst bed develops an uneven distribution near the top of the bed, that uneven distribution is likely to remain through the entire bed. In an embodiment, inserting an additional catalyst platform into an existing reactor allows a catalyst bed to be divided into two beds having shorter bed lengths. This can provide a gap for using a flow distributor between the beds, which can allow for redistribution of the fluid flow at an intermediate point in the reactor.

The support pipe for supporting the catalyst bed platform can also be used to support a flow distributor. A flow distributor can be a distributor plate, a distributor tray, or any other type of reactor internal that can be used to distribute the flow exiting from a catalyst bed. In an embodiment, the flow distributor can be supported by the center support pipe without any attachment to the cladding or coating of the reactor wall(s). In an alternate embodiment, the flow distributor can be attached to the coating layer of the reactor wall.

Center Support Pipe and Catalyst Bed Platform Support

In various embodiments, the catalyst bed platform can be supported by a support pipe. Preferably, the support pipe can be a centrally located support pipe. This can correspond to the central axis of the support pipe being approximately aligned with the geometric center of the catalyst bed. Additionally or alternately, the central axis of the support pipe can be approximately aligned with the central axis of the reactor.

A center support pipe can be constructed from any materials suitable for supporting a catalyst bed platform in the reaction environment present in the reactor. For example, the pipe can be constructed from a bulk structural material similar to the reactor wall(s), with a coating or cladding layer on the outside that is more resistant to corrosion or other reactions. Other choices of material are possible, so long as the center pipe has sufficient strength to transfer the weight of the catalyst platform to the bottom of the reactor.

The center support is referred to here as a pipe due to the fact that the center support may optionally be hollow for at least a portion of the length of the pipe. Use of a hollow center support, or a center support pipe, can allow the interior volume of the center support to be used as a pathway for unloading catalyst. In such an embodiment, an opening can be included in the catalyst bed platform to allow for removal of catalyst from the catalyst bed platform. The exit for the catalyst dumping tube can be located far enough down the center support pipe so that the exit is below the top of where catalyst would be in the lower catalyst bed.

The center support pipe can be supported by a structure that serves as the outlet collector. Additionally or alternately, the center support pipe can be supported by a plurality of legs that can advantageously rest on the floor of the reactor. Any convenient number of legs can be used, such as three or more, e.g., four or more.

Use of a center support pipe for supporting a catalyst bed platform can provide a variety of advantages. A center support pipe can be compatible for use with conventional types of catalyst bed platforms. A catalyst bed platform supported by a center support pipe can also be leveled sufficiently to approximate the levelness of a conventional catalyst bed. In a situation where an additional catalyst bed is desired in an existing single-bed reactor, a catalyst bed platform with a center support pipe can allow for installation of an additional catalyst bed without having to support the catalyst bed via welding to the bulk structural portion of the reactor wall(s). Introducing a catalyst bed platform with a center support pipe does result in an excluded volume in the center of the reactor. However, the excluded volume from the center pipe can typically be small relative to the total volume of the reactor.

An additional or alternate consideration in design of the catalyst bed platform and center support pipe can be relative expansion of the center support pipe during operation. A hydroprocessing reactor is typically constructed using one material as a structural material, and a second material as a coating or cladding layer that provides improved resistance to the reaction conditions. The same type of design choice could be used for construction of the center support pipe. This would lead to a center support pipe with similar thermal expansion characteristics to the reactor.

Alternately, the center support pipe can be composed of the resistant material throughout the pipe. In such a situation, the thermal expansion characteristics of the center support pipe may differ from the expansion characteristics of the reactor. As a result, the growth of the center support pipe may differ from the expansion of the reactor by as much as a few inches. Although the catalyst bed platform typically does not contact the reactor walls, a fill material between the platform and the reactor walls can be in contact. Additionally or alternatively, the catalyst in the catalyst bed platform may be in contact with the reactor walls. As differential expansion occurs between the catalyst bed platform and the reactor, frictional forces can place additional load on the platform structure. Such additional forces can and should be accounted for in the design of the catalyst bed platform.

Catalyst Loading and Unloading

As noted above, various (conventional) catalyst bed platform designs can be used with a center support pipe in various embodiments. As a result, catalyst loading of the catalyst bed platform can be performed by typical loading methods. Examples of suitable methods for catalyst loading can include, but are not limited to, "sock" loading or dense loading. In embodiments where the center support pipe includes a catalyst dumping tube, when catalyst is loaded into the reactor, the lower bed of the reactor can be filled first. The catalyst dumping tube can then be filled with a suitable material, such as an inert material, a catalyst used in the lower bed, and/or a catalyst to be used for the upper catalyst bed supported by the catalyst bed platform. Filling the catalyst dumping tube can prevent removal of catalyst from the upper catalyst bed supported by the catalyst bed platform until desired. The upper catalyst bed can then be loaded into the reactor.

For catalyst unloading, the center pipe can be used in combination with the existing catalyst unloading equipment of a reactor. When it is desired to remove catalyst from the catalyst bed platform supported by the center support pipe, one option can be to use suction or vacuum methods.

When it is desired to remove catalyst from the reactor, catalyst from the lower catalyst bed can be removed from the reactor, e.g., in a conventional manner. As catalyst is removed, the level of catalyst in the lower catalyst bed will drop below the level of the exit for the catalyst dumping tube. This can allow the catalyst from the catalyst bed platform to pass through the catalyst dumping tube and into the lower catalyst bed for removal. In some embodiments, to completely remove the catalyst from the catalyst bed platform, forced air or another mechanism to move catalyst from the edges of the catalyst bed platform to the catalyst dumping tube may be needed. Removing catalyst via the center support pipe can allow gravity to be the primary force for removing catalyst from the bed, as opposed to primary suction or vacuum techniques for removing catalyst, e.g., by lifting the catalyst out of a bed.

Additionally or alternatively, one or more catalyst dumping tubes can be included outside of the center support pipe, in place of or in addition to a catalyst dumping tube inside the center support pipe. The catalyst dumping tubes outside of the center support pipe can operate in a manner similar to the other catalyst dumping tubes described herein. The catalyst dumping tubes outside of the center support pipe can result in additional excluded volume within the reactor. In some embodiments, however, this additional excluded volume can be primarily located in the space between the upper and lower catalyst beds, so the additional excluded volume can correspond to space that can contain little or no catalyst anyway.

Example of Center Pipe Structure

FIG. 1a schematically shows an example of a catalyst bed platform supported by a center support pipe. FIG. 1a provides a side view of a catalyst bed platform 110. In the embodiment shown in FIG. 1a, the platform is composed of a plurality of cross beams 112 and 113 that support a grid or mesh 114. Depending on the embodiment, some of the cross beams 113 can be directly supported by center pipe 120, while other beams 113 can transfer weight to the center pipe 120 via support arms 122. Center pipe 120 can also support a flow distributor 130. The flow distributor 130 can include one or more distributor plates, distributor trays, and/or other devices for more evenly distributing a fluid flow. Optionally, flow distributor 130 can include or be replaced by a quench facility that can introduce additional fluid into the reactor between the catalyst beds. Center pipe 120 can be supported by support legs 140. In the embodiment shown in FIG. 1a, two of four support legs are shown.

Figure 1B:
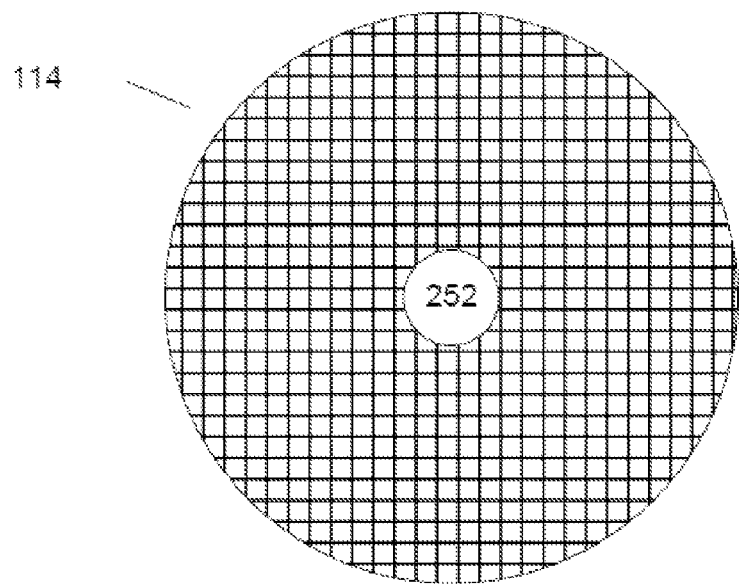
FIG. 1b schematically shows a top down view of a catalyst bed platform according to an embodiment of the invention.

FIG. 1b shows a top down view of the catalyst bed platform. In FIG. 1b, grid or mesh 114 covers all or nearly all of the surface area of the catalyst bed platform. Grid or mesh 114 is schematically represented here, but should be understood to have a mesh size suitable for supporting a desired type of catalyst particle. Suitable catalyst particles can include hydroprocessing catalysts. The embodiment in FIG. 1b also includes an opening 252 for the catalyst dumping tube.

Figure 1C:
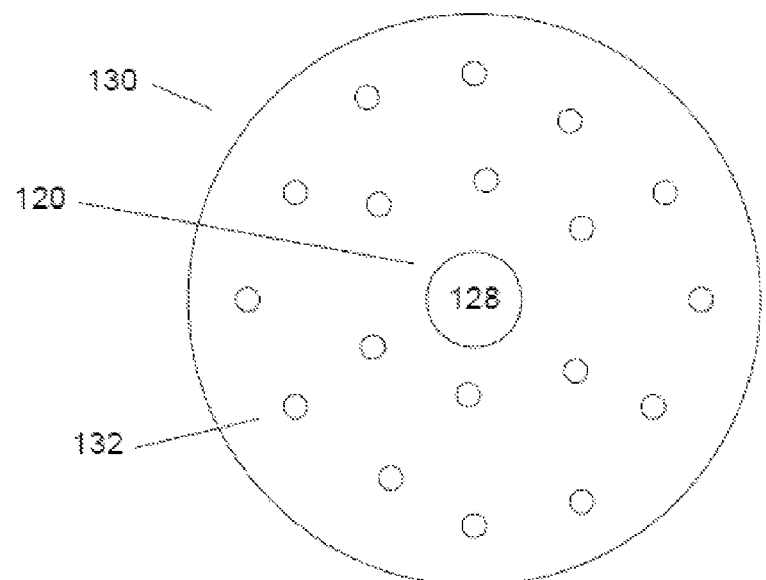
FIG. 1c schematically shows a top cutaway view of a catalyst bed platform in the plane of a flow distributor.

FIG. 1c shows a cut away view of the structure in FIG. 1a in the plane of the flow distributor 130. In FIG. 1c, flow distributor 130 is represented as a plate containing perforations or holes 132. Nevertheless, any convenient type of flow distributor can be used. Flow distributor 130 can be supported by center pipe 120. However, fluid in the flow distributor 130 in this embodiment is not in fluid communication with the interior 128 of center pipe 120.

Example of Center Pipe Structure within a Reactor

Figure 2:
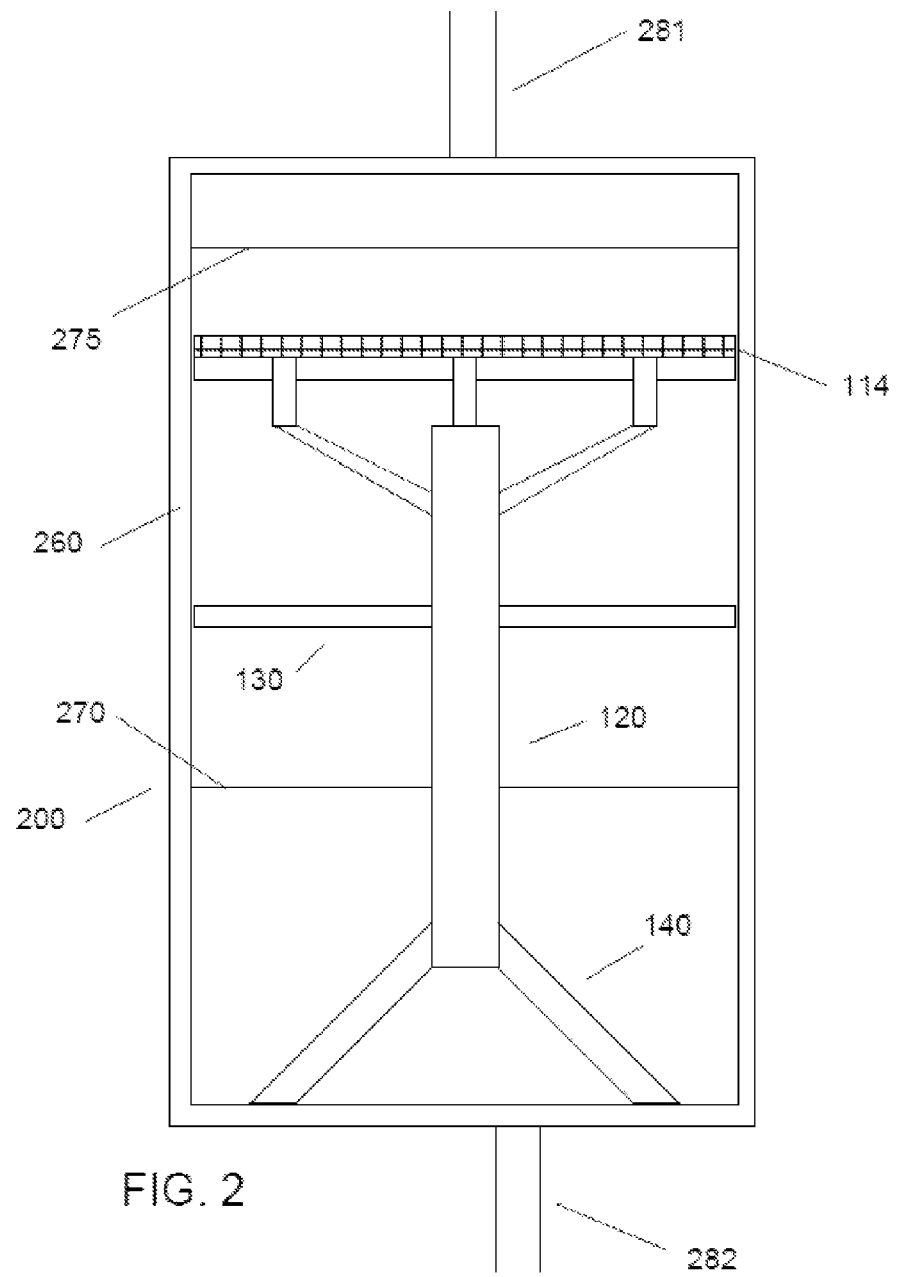
FIG. 2 schematically shows a catalyst bed platform according to an embodiment of the invention in a reactor.
Figure 3:
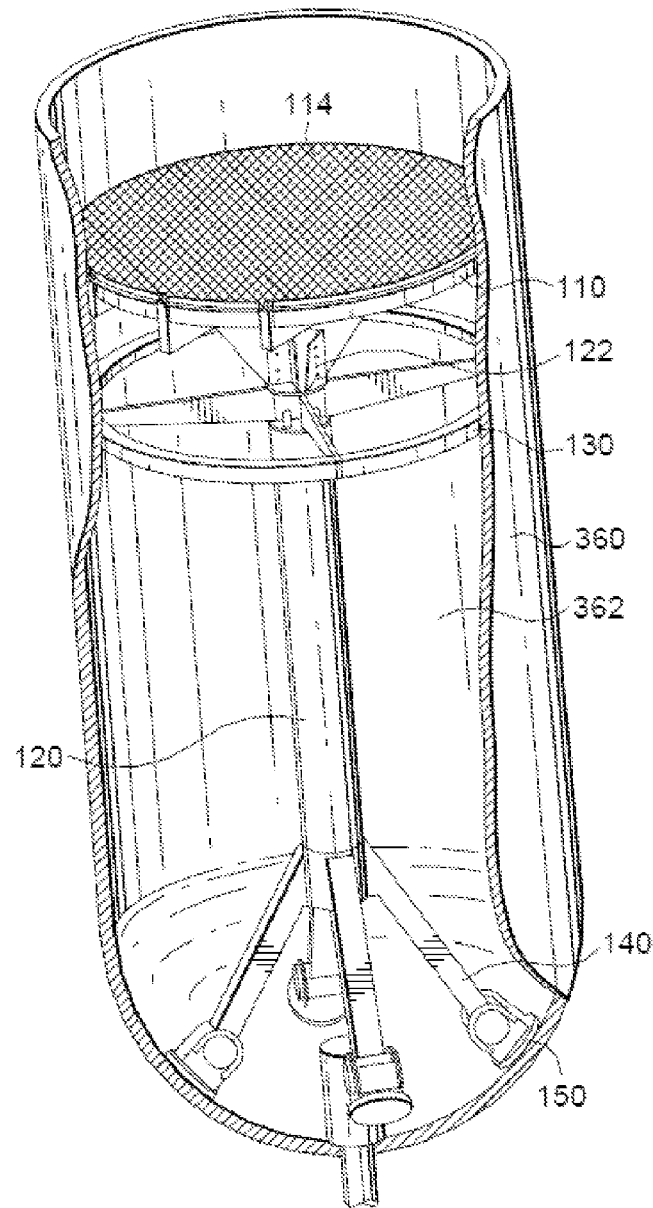
FIG. 3 provides a perspective view of a catalyst bed platform according to an embodiment of the invention in a reactor.

FIG. 2 schematically shows a view of a catalyst bed platform supported by a center pipe within a reactor 200. Reactor 200 includes a reactor wall 260. For convenience, reactor 200 is shown as having a flat bottom in FIG. 2, but any convenient reactor shape can be used. FIG. 3 shows an example of a reactor with a different bottom profile.

In FIG. 2, reactor 200 includes two catalyst beds 270 and 275. Catalyst bed 270 corresponds to a catalyst bed supported by the floor of the reactor. In this example, the existing reactor was initially configured for one catalyst bed 270. The addition of catalyst bed platform allows for second catalyst bed 275 to be formed in the existing reactor. During operation, fluids for use in a reaction can enter reactor 200 at a location above the top of catalyst bed 275, such as inlet 281. The fluids can pass through catalyst bed 275 and then through the mesh 114. The fluid can then pass through flow distributor 130 prior to entering catalyst bed 270. Note that a portion of the volume of catalyst bed 270 can be displaced by the center pipe 120 and the supporting legs 140. The reactor effluent can then be withdrawn via an outlet 282.

FIG. 3 provides a perspective schematic view of a catalyst bed platform with center support pipe in a reactor. In FIG. 3, part of the outer shell of the reactor is cut away to allow for the view of the interior. FIG. 3 shows a reactor that includes a reactor wall 360. The interior surface 362 of reactor wall 360 has a protective layer or coating to provide resistance to reactions taking place within the reactor. In FIG. 3, the bottom of the reactor has a rounded or elliptical shape. In order to improve the contact between support legs 140 and the reactor wall 360, support legs 140 are shown with optional feet 150. Feet 150 can be rotated to better align the surface of the feet with the interior surface 362 of reactor wall 360.

It is noted that in some optional embodiments, the presence of the center pipe structure and catalyst bed platform can allow a loaded reactor to have a similar weight to a loaded reactor without the additional center pipe structure and catalyst bed platform. Although the catalyst bed platform and center pipe structure add weight, the center pipe also creates an excluded volume within the lower catalyst bed. This excluded volume of catalyst can result in a reduced catalyst weight that can be comparable to the weight gain from the additional structures.

Example of Construction of a Platform in a Reactor

As noted above, one of the challenges of adding a catalyst bed platform to an existing reactor is that the pieces for constructing the platform have to enter the reactor. In the following example, a method for constructing a platform is described based on the pieces for constructing the platform entering through a top manway. In this example, the manway diameter is about 24 inches (about 61 cm), and the inner diameter of the reactor is about 150 inches (about 380 cm). In other examples, other reactor manway and/or inner diameters can be accommodated.

Note that the size of the catalyst bed platform components can depend on the size of the reactor, the manway diameter, and other reactor dimensions. The size of the catalyst bed platform pieces can additionally or alternately depend on the location for the catalyst bed platform in the reactor. For example, a reactor that has a catalyst bed with a bed length of about 60 feet (about 18 meters) can be split in various ways. The exact nature of the catalyst bed platform structure can depend on how much volume is desired for the upper and lower catalyst beds.

In the example below, some or all of the various components shown for constructing the collector, center support pipe, catalyst bed platform, and optional distributor tray can represent pieces with machine cut tolerances. In some situations within a refinery, hand cut components can be suitable for building structures for use in a reactor. However, in some embodiments, the integrity of the resulting catalyst bed platform structure can be improved by using pieces with machine cut tolerances.

Figure 4:
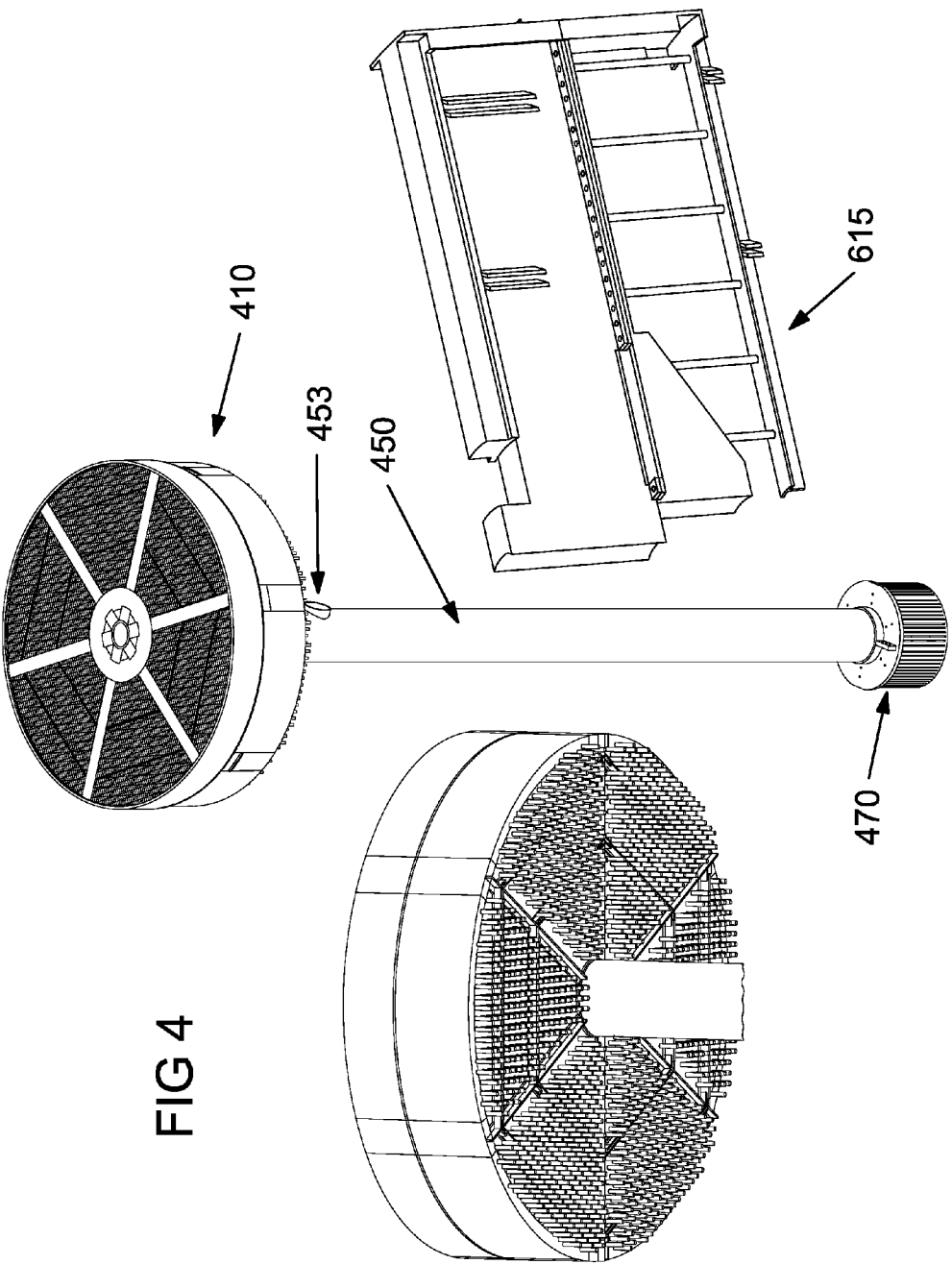
FIG. 4 shows an overview of a catalyst bed platform with a center pipe support according to another embodiment of the invention.

This example of construction shows an embodiment where the support for the support pipe is provided by the collector, as opposed to having a series of legs supporting the support pipe. FIG. 4 shows the assembled structure, which includes a catalyst bed platform 410, a center support pipe 450, and a collector 470. In an embodiment, the collector 470 can be placed in a reactor over a central bottom drain or exit conduit in the reactor. The catalyst bed platform 410 can have an outer diameter roughly corresponding to the inner diameter of the reactor. Optionally, the outer diameter of the platform 410 can include a lip structure that can assist with supporting a till material for any gap between the platform and the inner surface of the reactor. The center pipe 450 can be a single piece having a diameter less than the manway diameter. In an embodiment where center pipe 450 includes a catalyst dump tube opening 453, an exhaust opening cover or pipe can optionally be bolted on after the pipe is passed through the manway.

In this example, construction of the structure can begin with the collector 470. FIG. 5a shows an example of a spider 572 and wedge piece 580 for constructing the collector. Spider 572 can include a series of slots 574 or space between flanges. The slots 574 can be arranged radially around the center of the spider 572. The slots 574 can receive an inserting portion 582 of wedge piece 580. The inserting portion 582 can facilitate bolting of the wedge piece 580 to the spider 572 for structural support. Throughout the structure, where access is available to both sides of a surface, pieces for assembly can be connected using bolting holes 501 in the piece. Additionally or alternately, some pieces can be connected using a bolting bar 503, to provide a convenient surface for connectivity. The spider 572 can have any convenient diameter. In some embodiments, the spider 572 can have a diameter sufficient to reasonably fit through the entry manway. Alternately, the spider can be brought into the reactor in pieces and welded or joined together within the reactor, which can allow for a larger diameter for the spider. For the wedge pieces, any convenient number can be used, so long as each wedge piece is small enough to fit through the entry manway. In the embodiment shown in FIG. 5a, the diameter of the assembled collector is about twice the diameter of the 24 inch manway diameter. In this embodiment, dividing the collector into six wedges is sufficient to allow the pieces to fit through the manway.

Figure 5B:
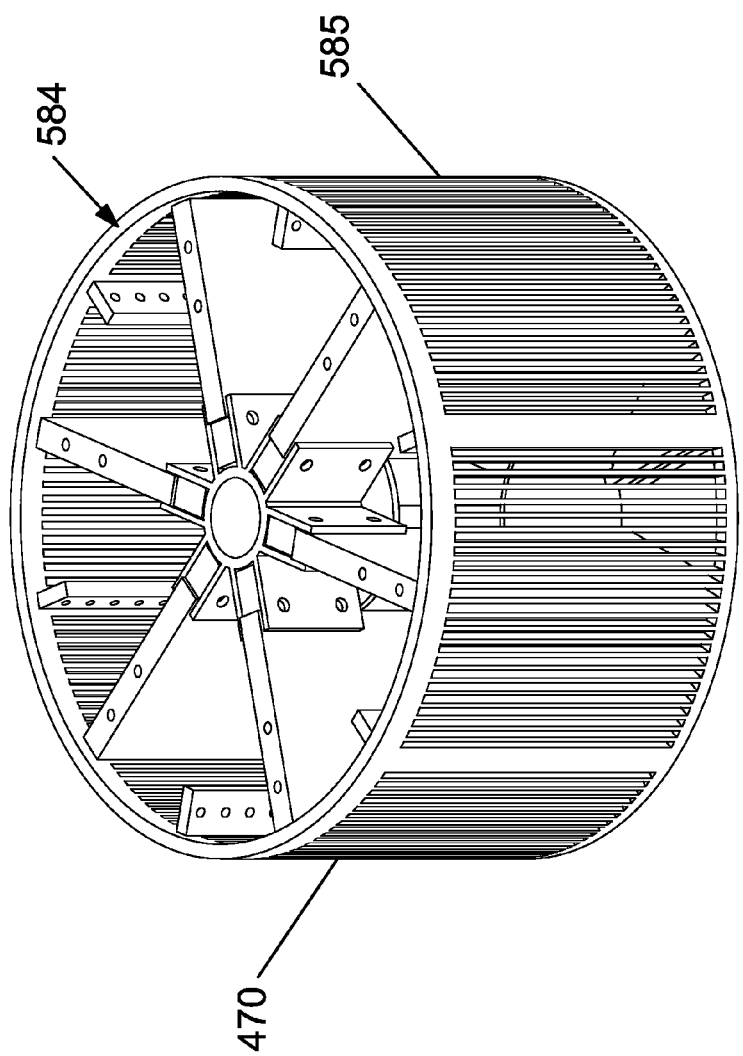

FIG. 5b shows the wedge pieces assembled into the spider to form a collector 470. The collector 470 has a grating structure 585 that can allow fluid to pass through the collector grating while preventing catalyst particles from passing through. In the embodiment shown in FIG. 5b, the assembled wedge pieces form an outer lip 584. Note that the embodiment shown in FIG. 5b appears to have a roughly planar bottom surface. The shape of the bottom surface for a collector 470 can optionally be matched to the shape of the bottom surface of a reactor.

In various embodiments, the outlet collector (and therefore the catalyst bed platform) can be supported on the bottom head of the reactor. As an alternative to matching the shape of the bottom of the collector to the shape of the reactor, the collector can have a flat bottom. In such an embodiment, a plurality of optional pads can be used, e.g., to more evenly distribute the load from the collector across the bottom head. This can reduce the stress experienced by the bottom head of the reactor. FIG. 8 shows an example of this type of embodiment. In the example shown in FIG. 8, six pads 825 are placed under the outlet collector 470, e.g., to distribute the downward load from the catalyst bed platform into the bottom head. Alternately, any convenient number of pads 825 can be used, so long as the pads can pass through the manway. The top of the pads can have a shape that corresponds to the shape of the bottom of the outlet collector, such as a flat shape. The bottom of the pads can have, or can be contoured to correspond to, the shape of the bottom head clad. In some embodiments, the pads can be designed to have the outlet collector interlock with the pad at a pad to outlet collector junction. The pads can optionally be connected to the vessel, to each other, and/or to the outlet collector. Bolted clamps and or welding can be used to attach the outlet collector to the pads. If desired, a retaining ring can be used to join the separate pads. If it is desired to secure the pads to the clad on the bottom head, bolted clamps can additionally or alternately be used. The clamps could alternately be welded to the vessel clad. In other embodiments, no connection may be necessary between the pads and the vessel, the other pads, and/or the outlet collector.

FIG. 5c shows bottom and side views of a piece 592 for a collector hat. The collector hat pieces 592 can be passed through the manway and assembled inside the reactor using a bolting bar 593. Collector hat pieces 592 can also include guide slots 594 that can lock onto the top of wedge pieces 580 when assembled. In some embodiments, the collector hat pieces 592 can include an outer groove 596 for seating on top of outer lip 584 of the assembled wedge pieces. The assembled collector hat can be bolted to the wedge pieces via bolting holes 598. FIG. 5d shows the assembled collector hat 590 on top of collector 470. The collector hat 590 includes a support ring 599 for receiving the bottom of the center support pipe 450. In the embodiment shown in FIG. 5d, the assembled collector hat 590 has a roughly planar shape. In another embodiment, the collector hat 590 can have a conical shape.

Another aspect of the assembly is the assembly of the catalyst bed platform itself. The catalyst bed platform can be supported by a plurality of catalyst support beams 615, e.g., as exemplified in FIG. 6a. The catalyst support beams 615 can be single pieces, or the beams can enter through the manway as separate pieces that are assembled. In the embodiment shown in FIG. 6a, catalyst support beam 615 can be assembled inside a reactor after passing pieces 622 and 623 through the manway. The pieces 622 and 623 can be joined by a groove weld 625 as well as bolting flanges 627. Secondary support clips 628 can provide a clip location for secondary support beams to intersect the catalyst support beams. The length of the catalyst support beam 615 can correspond to the distance from the center support pipe to approximately the inner surface of the reactor. The portion of the catalyst support beam 615 that comes into contact with the inner surface of the reactor is lip portion 621. At the other end of catalyst support beam 615, end portion 617 can be inserted into a support slot at the top of center support pipe 450. The ring groove 619 will be discussed further below.

Figure 6B:
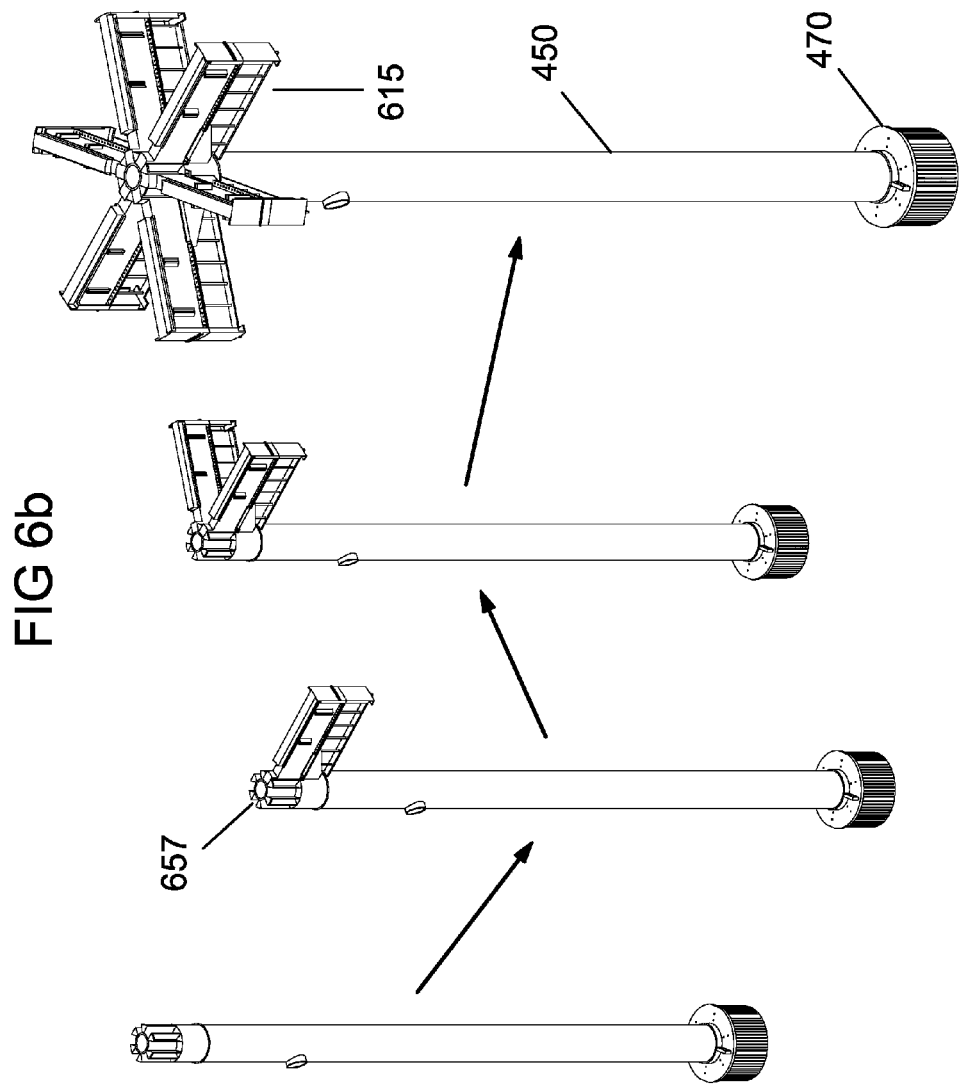

FIG. 6b shows catalyst support beams 615 being assembled onto a center support pipe 450. In FIG. 6b, the center support pipe 450 has already been seated on the collector 470. In the embodiment shown in FIG. 6b, six catalyst support beams 615 are shown. The catalyst support beams 615 can be inserted into receiving slots 657. In alternate embodiments, the plurality of catalyst support beams 615 (and receiving slots 657) can comprise any convenient number, so long as the beams can support the weight of the catalyst bed. It is noted that the number of beams can increase based on the diameter of the reactor. Depending on the embodiment, the number of beams can be at least about 4, for example at least about 6, at least about 8, or at least about 10. The beams can be assembled from beam pieces that can fit through the manway. The beam pieces can be joined by any convenient method, such as welding or bolting.

Figure 6C:
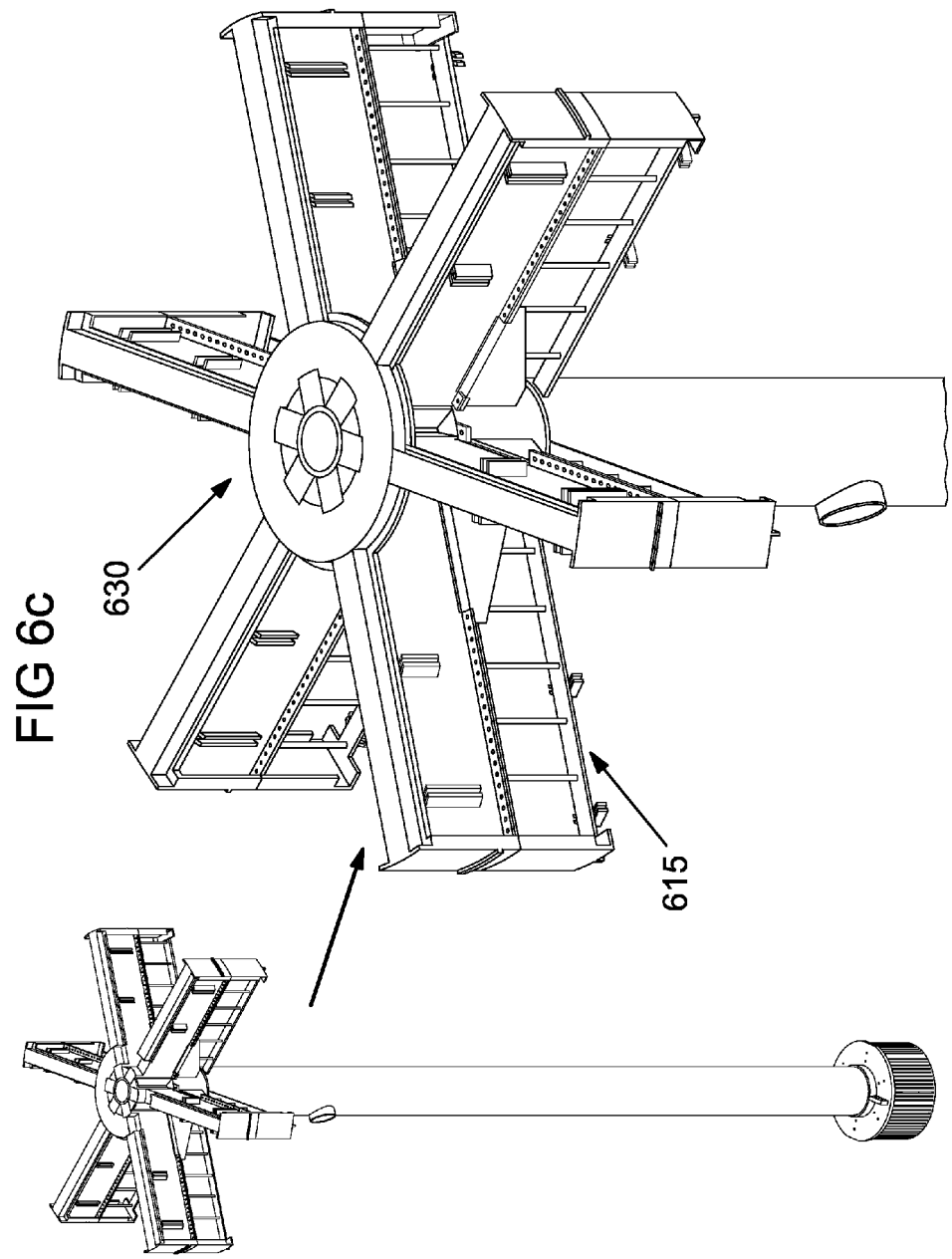

FIG. 6c shows a ring support 630 that has been placed or seated in ring groove 619 of the catalyst support beams 615. The ring support can be brought in as a single piece or as several pieces that are joined inside the reactor. The size of the ring support can be based on the structural needs for supporting the catalyst bed platform and/or on the size of the manway. With regard to support for the catalyst bed, the center support pipe 450 can provide the vertical support for the load. The ring support 630 can provide the reaction moment to support the catalyst support beams 615. Based on the expected load in the catalyst bed, the size of the ring support (including inner diameter, outer diameter, and ring thickness) and the corresponding ring groove can be selected to satisfy the structural support requirements. Such structural support requirements can be determined, for example, by finite element modeling of a structure.

Fabrication of the ring support 630, ring groove 619, and catalyst support beam 615 can benefit from precise fabrication tolerances. Because the ring support 630 can provide the reaction moment for the cantilever structure, any gaps between the ring support and the surfaces of the ring groove could potentially lead to undesired deflection and/or plastic deformation of the support beam 615.

Several options are available for connections related to ring support 630. In some embodiments, ring support 630 can be assembled in the reactor from multiple pieces, such as by welding pieces together. One option for welding the ring support pieces together can be to weld the ring support after seating the individual pieces in the ring groove 619. In this type of embodiment, a radial weld or "J-weld" connection can be used to join the ring pieces together. The weld can match the shape of the visible portion of the seam between the pieces of the ring, which can resemble a letter J. It is noted that welding together the ring pieces to form ring support 630 can tend to contract the ring as the weld is formed. This can have the advantage of forming a tighter contact between the ring support 630 and the support beams 615, by drawing the ring support toward the inner portion of ring groove 619 as the weld is formed. Ring support 630 can be attached to the catalyst support beams 615 in any convenient manner. Based on the configuration of the ring in the ring groove, welding may not be required for attachment of the ring support 630 to the catalyst support beams 615.

FIG. 6d shows additional parts of the catalyst bed platform support structure, if needed. Secondary catalyst support beams 635 can be inserted into secondary support clips 628 and can provide additional stability for the catalyst bed platform. FIG. 6d also shows an optional catalyst dumping tube 652. Catalyst dumping tube 652 can provide a method for removing catalyst from a catalyst bed supported by the catalyst bed platform. As shown in FIG. 6d, catalyst dumping tube 652 can be located in the interior of center support pipe 450. Additionally or alternately, one or more catalyst dumping tubes can be present outside of center support pipe 450. When a reactor is unloaded, catalyst can pass through catalyst dumping tube 652 and drop to the lower catalyst bed in the reactor. The catalyst can then be removed from the reactor by any convenient method.

FIG. 6e shows skirt sections 637 being added to the outer diameter of the catalyst bed platform. FIG. 6f provides additional views of a skirt section 637. Skirt sections 637 can be added, if needed, to provide a continuous surface for the outer diameter. In one embodiment, the diameter of the catalyst bed platform can be selected so that skirt sections 637 do not contact the reactor walks). A skirt lip 639 of the catalyst bed platform can approach the wall, but typically no contact will occur. In order to prevent liquid from bypassing the catalyst bed platform around the exterior of the platform, a fill material can be used to fill the gap formed above the skirt lip 639 between the skirt section 637 and the inner diameter of the reactor. The fill material, such as a glass rope material, can be in contact with the inner diameter of the reactor. On the inner circumference side of the skirt, a catalyst support ring 641 can be included to provide additional edge support for the grid sections used to support the catalyst. A distributor tray support ring 642 can be included to provide additional edge support for a distributor tray or other flow distributor.

FIG. 7a shows addition of secondary distributor tray support beams 744 to the catalyst bed platform, if necessary, which can intersect with the catalyst support beams 615. In the embodiment shown in FIG. 7a, the distributor tray forms part of the catalyst bed platform. In an alternative embodiment, the distributor tray support structure can be separate from the catalyst bed platform. It is noted that the majority of the weight and/or pressure exerted on the catalyst bed platform can be due to the weight of the catalyst bed and the pressure drop across the catalyst bed. The lower loads experienced by the distributor tray can be accommodated, if desired, by clipping or welding a distributor tray to the cladding layer of the inner wall(s) of the reactor.

FIG. 7b shows the addition of distributor tray panels 762 to form a distributor tray. The distributor tray panels 762 can rest on and/or be clipped to and/or can otherwise be supported by the secondary distributor tray support beams 744. The distributor tray panels 762 can additionally or alternately be clipped to and/or supported by the catalyst support beams 615.

FIG. 7c shows the addition of a catalyst support grid sections 764 to form the catalyst bed support. The catalyst support grid sections 764 can be supported by catalyst support beams 615 and/or secondary catalyst support beams 635. The grid sections can provide support for catalyst particles, so that migration of catalyst particles does not occur between the top catalyst bed and the bottom catalyst bed. In the embodiment shown in FIG. 7c, the catalyst support grid section 764 is shown as a wedge shaped section. Alternatively, any convenient types of catalyst support sections 764 can be used, so long as the sections can pass through the manway. For example, the catalyst support sections 764 may not all have to have the same shape, so long as the resulting combination of catalyst support sections 764 produces a catalyst bed support surface.

Figure 7D:
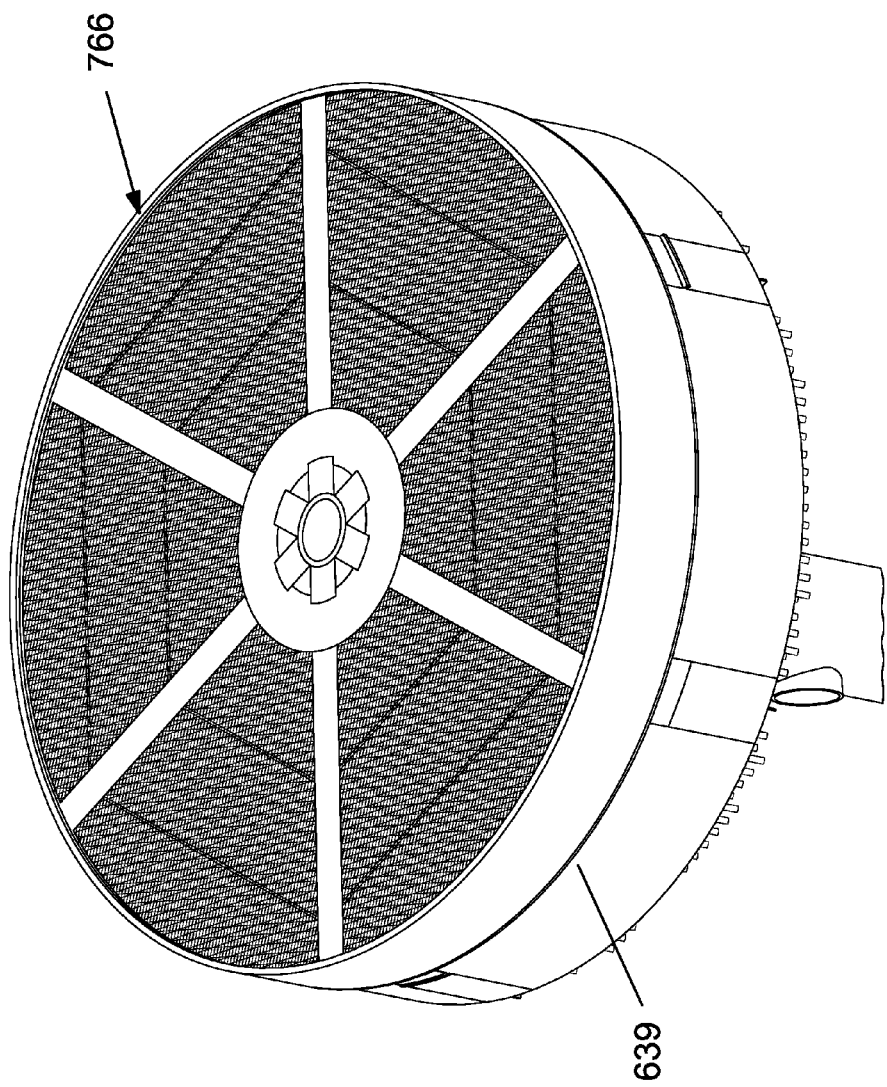
FIG. 7d shows an example of an assembled catalyst support grid according to an embodiment of the invention.

FIG. 7d shows a catalyst bed platform with a fill material 766 around the perimeter. The embodiment shown in FIG. 7d represents a structure as it could occur within a reactor. The fill material 766 can reside in the gap formed between the outer skirt of the catalyst bed platform and the inner surface of the reactor. The fill material 766 is supported by the skirt lip 639.

Example of Use in Hydroprocessing

In this example, a catalyst bed platform with a center support pipe can be used to add a catalyst bed to a hydroprocessing reactor. For purposes of this example, an existing reactor is used that originally has a single catalyst bed. During a catalyst turn-around, the catalyst bed platform with a center support pipe can be constructed within the reactor. The reactor can then be loaded with two beds of catalyst. A first hydroprocessing catalyst can be loaded in the lower (original) catalyst bed, while a second hydroprocessing catalyst can be loaded on the new catalyst bed platform. The first and second hydroprocessing catalysts can be the same or different. Optionally, the first and second hydroprocessing catalysts can be catalyst systems, comprising a series of catalysts stacked on top of one another. The first and second hydroprocessing catalysts can be selected from any convenient catalyst or catalyst system for hydrotreatment, catalytic hydroisomerization and/or dewaxing, hydrofinishing, and/or other desired hydroprocessing function(s).

In this example, the reactor can be configured for diesel hydroprocessing. Insertion of the catalyst bed platform can allow for two stage hydrotreatment of a diesel feed. In this example, the first and second hydroprocessing catalysts can both be selected as diesel hydrotreatment catalysts. The reactor can then be operated under effective hydrotreatment conditions. In other applications, a catalyst bed platform can be added to a reactor used for hydrocracking, chemicals processing, and/or another type of catalytic processes that can benefit from the addition of a catalyst bed to a reactor.

In various embodiments, a suitable catalyst for hydrotreatment, aromatic and/or olefin saturation, hydroisomerization/dewaxing, and/or hydrofinishing can be a catalyst composed of one or more Group VIII and/or Group VIB metals, either bulk or on a support, optionally containing a binder. The one or more Group VIII and/or Group VIB metals can include, but are not limited to, Co, Ni, Fe, Mo, W, Pt, Pd, Rh, Ru, Ir, or a combination thereof. In a supported catalyst embodiment, the metal can be Pt and/or Pd. In an alternate catalyst embodiment, the metal can be one or more of Co, Ni, Mo, and W, such as CoMo, NiW, NiMo, or NiMoW.

When present, examples of suitable supports can include, but are not limited to, magnesium oxides; hydrotalcites; other various types of clays; activated carbon; refractory oxides including one or more metals selected from aluminum, silicon, titanium, zirconium, vanadium, molybdenum, manganese, and cerium; silicoaluminophosphates; aluininophosphates; aluminosilicates (zeolites); and combinations thereof. In some embodiments where hydrothermal stability is desired, the support material can be substantially free of alumina. As used herein, "substantially free" of alumina should be understood to mean less than 1 wt % alumina, preferably less than 0.1 wt % alumina, for example less than 0.01 wt % of alumina, completely no added alumina, or completely no alumina.

When present, examples of suitable binders can include, but are not limited to, refractory oxides including one or more metals selected from aluminum, silicon, titanium, zirconium, vanadium, molybdenum, manganese, and cerium. In some embodiments where hydrothermal stability is desired, the binder material can be substantially free of alumina.

In bulk catalysts, the total amount of metals can be at least about 60 wt %, for example at least about 65 wt %, at least about 70 wt %, at least about 75 wt %, at least about 80 wt %, at least about 85 wt %, or at least about 90 wt %, based on the total catalyst weight. Additionally or alternately in bulk catalysts, the total amount of binder (in bulk catalysts, although a support material can optionally be present independent from a binder material, since the metals are not strictly deposited thereon, both traditional support materials and binder materials are classified together as bulk metal catalyst binders) can be no more than about 40 wt %, for example no more than about 35 wt %, no more than about 30 wt %, no more than about 25 wt %, no more than about 20 wt %, or no more than about 15 wt %, based on the total catalyst weight.

For supported catalysts, the amount of noble metal supported on the catalyst, when present, can be at least about 0.1 wt %, for example at least about 0.5 wt %, at least about 0.6 wt %, at least about 0.75 wt %, or at least about 1.0 wt %, based on the total catalyst weight. Additionally or alternately, the amount of noble metal supported on the catalyst, when present, can be about 2.0 wt % or less, for example about 1.5 wt % or less, about 1.0 wt % or less, about 0.75 wt % or less, or about 0.6 wt % or less, based on the total catalyst weight. More generally for supported catalysts, the amount of metal(s), individually or in mixtures, on the catalyst support can be at least about 0.1 wt %, for example at least about 0.25 wt %, at least about 0.5 wt %, at least about 0.6 wt %, at least about 0.75 wt %, at least about 1 wt %, at least about 2.5 wt %, or at least about 5 wt %, based on the total catalyst weight. Additionally or alternately, the amount of metal(s), individually or in mixtures, on the catalyst support can be about 35 wt % or less, for example about 20 wt % or less, about 15 wt % or less, about 10 wt % or less, or about 5 wt % or less, based on the total catalyst weight. The amounts of metals may be measured by methods specified by ASTM for individual metals including atomic absorption spectroscopy (AAS) or inductively coupled plasma-atomic emission spectrometry (ICP-AES).

Additionally or alternately for supported catalysts, the amount of binder, when present, can be at least about 10 wt %, for example at least about 20 wt %, at least about 25 wt %, at least about 30 wt %, at least about 35 wt %, or at least about 40 wt %, based on the total weight of the catalyst. Further additionally or alternately for supported catalysts, the amount of binder, when present, can be no more than about 80 wt %, for example no more than 70 wt %, no more than 60 wt %, no more than 50 wt %, no more than 45 wt %, no more than 40 wt %, or no more than 35 wt %, based on the total weight of the catalyst.

In some embodiments, the catalyst metals can be present in the form of an oxide, a sulfide, or the like. Additionally or alternately, catalyst metals can be present in a metallic state. Further additionally or alternately, catalyst metals can be present, optionally on a support, in any convenient form. When catalyst metals are present, e.g., on a support, if the form of a metal salt, the metal salt can include a metal acetate, a metal carbonate, another organometallic form, or a combination thereof.

The hydrotreating conditions can include a temperature of at least about 260° C., for example at least about 300° C.; additionally or alternately, the temperature can be about 425° C. or less, for example about 400° C. or less or about 350° C. or less. The hydrotreating conditions can additionally or alternately include a liquid hourly space velocity (LHSV) of at least about 0.1 $hr^{-1}$, for example at least about 0.3 $hr^{-1}$, at least about 0.5 $hr^{-1}$, or at least about 1.0 $hr^{-1}$, additionally or alternately, the LHSV can be about 20 $hr^{-1}$ or less, for example about 10 $hr^{-1}$ or less, about 5.0 $hr^{-1}$ or less, or about 2.5 $hr^{-1}$ or less. The hydrotreating conditions can further additionally or alternately include a hydrogen partial pressure in the reactor from about 1.4 MPag (about 200 psig) to about 20.7 MPag (about 3000 psig), for example about 2.8 MPag (about 400 psig) to about 13.8 MPag (about 2000 psig). The hydrotreating conditions can still further additionally or alternately include a hydrogen to feed (treat gas) ratio from about 85 $Sm^3/m^3$ (about 500 scf/bbl) to about 1700 $Sm^3/m^3$ (about 10000 scf/bbl), for example about 170 $Sm^3/m^3$ (about 1000 scf/bbl) to about 850 $Sm^3/m^3$ (about 5000 scf/bbl).

Additional Embodiments

Additionally or alternately, the invention can include one or more of the following embodiments.

Embodiment 1. A catalyst bed platform structure, comprising: a catalyst bed platform; a support pipe supporting the bottom of the catalyst bed platform, a central axis of the pipe being approximately aligned with a geometric center of the catalyst bed platform; a flow distributor separated from the catalyst bed platform by a gap, the support pipe passing through the flow distributor and attached to the flow distributor to provide support for the flow distributor; and a pipe support structure supporting the bottom of the support pipe, the pipe support structure being adapted to reside on a bottom surface of an existing reactor having walls and a top opening, wherein the catalyst bed platform is formed from components capable of passing into the existing reactor through the top opening, which has a diameter of about 28 inches or less, without welding the catalyst bed platform to a structural portion of the reactor walls.

Embodiment 2. The catalyst bed platform structure of embodiment 1, wherein the pipe support structure comprises a collector structure and/or a plurality of support legs.

Embodiment 3. The catalyst bed platform structure of any one of the previous embodiments, wherein the catalyst bed platform comprises: a plurality of catalyst support beams extending radially from the support pipe, the plurality of catalyst support beams including a ring groove; and a ring support seated in the ring groove, at least a top portion of the support pipe passing through an inner opening of the ring, the ring support connecting the catalyst support beams to the support pipe in a cantilevered manner.

Embodiment 4. The catalyst bed platform structure of any one of the previous embodiments, wherein the catalyst bed platform further comprises a catalyst support grid, the catalyst support grid having a mesh size suitable for supporting catalyst particles, and a platform skirt forming an outer diameter surface for the catalyst platform.

Embodiment 5. A catalyst bed platform structure, comprising: a collector structure; a support pipe supported by the collector structure; a plurality of catalyst support beams extending radially from the support pipe, the plurality of catalyst support beams including a ring groove; a ring support seated in the ring groove, at least a top portion of the support pipe passing through an inner opening of the ring, the ring support connecting the catalyst support beams to the support pipe in a cantilevered manner; a catalyst support grid supported by the catalyst support beams; optionally one or more dumping tubes; and a platform skirt forming an outer diameter surface for the catalyst platform.

Embodiment 6. The catalyst bed platform structure of embodiment 5, further comprising a flow distributor located below the plurality of catalyst support beams, the flow distributor being at least partially supported by the support pipe and/or by beams supported by the support pipe.

Embodiment 7. The catalyst bed platform structure of any one of the previous embodiments, wherein an interior volume of the support pipe comprises a catalyst dumping tube, the catalyst bed platform having an opening above the interior volume of the support pipe for communication of catalyst particles from a volume above the catalyst bed platform to the interior volume of the support pipe.

Embodiment 8. The catalyst bed platform structure of embodiment 7, further comprising: a lower catalyst bed, the collector and at least a portion of the support pipe being within the lower catalyst bed; and an upper catalyst bed supported by the catalyst support grid, wherein the support pipe comprises a catalyst dumping tube filled with inert catalyst, the exit for the catalyst dumping tube being below a top level of the lower catalyst bed.

Embodiment 9. The catalyst bed platform structure of any one of embodiments 4-8, further comprising a fill material supported between the platform skirt and an inner wall of a reactor.

Embodiment 10. The catalyst bed platform structure of any one of the previous embodiments, wherein the catalyst bed platform structure is formed from pieces that can pass through an opening having a diameter of about 28 inches or less, for example about 26 inches or less or about 24 inches or less.

Embodiment 11. The catalyst bed platform structure of any one of embodiments 3 or 5-10, wherein the ring support comprises a plurality of ring support pieces, the ring support pieces being joined by a radial weld after seating the ring support pieces in the ring groove.

Embodiment 12. A method for dividing a catalyst bed in a reactor without welding a catalyst bed platform to a structural portion of the reactor walls, comprising: passing a plurality of catalyst bed platform components into a reactor through an opening having a diameter of about 28 inches or less, for example about 26 inches or less or about 24 inches or less, the reactor having a first catalyst bed volume; constructing a catalyst bed platform within the reactor using the catalyst bed platform components; supporting the constructed catalyst bed platform with a support pipe, the length of the support pipe corresponding to a height for the catalyst bed platform within the reactor, wherein the catalyst bed platform divides the first catalyst bed volume into an upper catalyst bed volume and a lower catalyst bed volume, at least one of the upper catalyst bed volume and the lower catalyst bed volume having a length to diameter ratio of about 4:1 or less.

Embodiment 13. The method of embodiment 12, wherein the first catalyst bed volume has a length to diameter ratio of at least about 6:1, and at least one of the upper catalyst bed volume and the lower catalyst bed volume has a length to diameter ratio of about 2.5:1 or less.

Embodiment 14. The embodiment of embodiment 12 or embodiment 13, wherein supporting the constructed catalyst bed platform comprises supporting the constructed catalyst bed platform without the catalyst bed platform contacting an inner wall of the reactor so that a gap is formed between the catalyst bed platform and the inner wall of the reactor, the method further comprising inserting a till material in the gap.

What is claimed is:

1. A catalyst bed platform structure, comprising:
   a catalyst bed platform;
   a support pipe supporting the bottom of the catalyst bed platform, a central axis of the pipe being approximately aligned with a geometric center of the catalyst bed platform, wherein an interior volume of the support pipe comprises a catalyst dumping tube;
   a flow distributor separated from the catalyst bed platform by a gap, the support pipe passing through the flow distributor and attached to the flow distributor to provide support for the flow distributor; and
   a pipe support structure supporting the bottom of the support pipe, the pipe support structure being adapted to reside on a bottom surface of an existing reactor having walls and a top opening;
   wherein the catalyst bed platform is formed from components capable of passing into the existing reactor through the top opening, which has a diameter of about 28 inches or less, without welding the catalyst bed platform to a structural portion of the reactor walls; and
   wherein the catalyst bed platform has an opening above the interior volume of the support pipe for communication of catalyst particles from above the catalyst bed platform to the interior volume of the support pipe.

2. The catalyst bed platform structure of claim 1, wherein the pipe support structure comprises a collector structure.

3. The catalyst bed platform structure of claim 1, wherein the pipe support structure comprises a plurality of support legs.

4. The catalyst bed platform structure of claim 1, wherein the catalyst bed platform comprises:
   a plurality of catalyst support beams extending radially from the support pipe, the plurality of catalyst support beams including a ring groove; and
   a ring support seated in the ring groove, at least a top portion of the support pipe passing through an inner opening of the ring, the ring support connecting the catalyst support beams to the support pipe in a cantilevered manner.

5. The catalyst bed platform structure of claim 1, wherein the catalyst bed platform further comprises a catalyst support grid, the catalyst support grid having a mesh size suitable for supporting catalyst particles.

6. The catalyst bed platform structure of claim 1, wherein the catalyst bed platform structure is formed from pieces that can pass through an opening having a diameter of about 24 inches or less.

7. A catalyst bed platform structure, comprising:
   a collector structure;
   a support pipe supported by the collector structure;
   a plurality of catalyst support beams extending radially from the support pipe, the plurality of catalyst support beams including a ring groove;
   a ring support seated in the ring groove, at least a top portion of the support pipe passing through an inner opening of the ring, the ring support connecting the catalyst support beams to the support pipe in a cantilevered manner;
   a catalyst support grid supported by the catalyst support beams; and
   a platform skirt forming an outer diameter surface for the catalyst platform.

8. The catalyst bed platform structure of claim 7, further comprising one or more catalyst dumping tubes.

9. The catalyst bed platform structure of claim 8, wherein a catalyst dumping tube is formed from the interior of the support pipe, the catalyst support grid having an opening above the support pipe to allow for passage of catalyst particles from the catalyst support grid to the catalyst dumping tube.

10. The catalyst bed platform structure of claim 7, further comprising a fill material supported between the platform skirt and an inner wall of a reactor.

11. The catalyst bed platform structure of claim 7, wherein the catalyst bed platform structure is formed from pieces that can pass through an opening having a diameter of about 24 inches or less.

12. The catalyst bed platform structure of claim 7, further comprising a flow distributor located below the plurality of catalyst support beams, the flow distributor being at least partially supported by the support pipe and/or by beams supported by the support pipe.

13. The catalyst bed platform structure of claim 7, wherein the ring support comprises a plurality of ring support pieces, the ring support pieces being joined by a radial weld after seating the ring support pieces in the ring groove.

14. The catalyst bed platform structure of claim 7, further comprising:
   a lower catalyst bed, the collector and at least a portion of the support pipe being within the lower catalyst bed; and
   an upper catalyst bed supported by the catalyst support grid.

15. The catalyst bed platform structure of claim 14, wherein the support pipe comprises a catalyst dumping tube filled with inert catalyst, the exit for the catalyst dumping tube being below a top level of the lower catalyst bed.

16. A catalyst bed platform structure, comprising:
   a catalyst bed platform;
   a support pipe supporting the bottom of the catalyst bed platform, a central axis of the pipe being approximately aligned with a geometric center of the catalyst bed platform;
   a flow distributor separated from the catalyst bed platform by a gap, the support pipe passing through the flow distributor and attached to the flow distributor to provide support for the flow distributor;
   a pipe support structure supporting the bottom of the support pipe, the pipe support structure being adapted to reside on a bottom surface of an existing reactor having walls and a top opening;
   a plurality of catalyst support beams extending radially from the support pipe, the plurality of catalyst support beams including a ring groove; and
   a ring support seated in the ring groove, at least a top portion of the support pipe passing through an inner opening of the ring, the ring support connecting the catalyst support beams to the support pipe in a cantilevered manner;
   wherein the catalyst bed platform is formed from components capable of passing into the existing reactor through the top opening, which has a diameter of about 28 inches or less, without welding the catalyst bed platform to a structural portion of the reactor walls.

* * * * *